(12) United States Patent
Malone et al.

(10) Patent No.: US 9,550,535 B2
(45) Date of Patent: Jan. 24, 2017

(54) AERODYNAMIC CONTROL SYSTEM AND METHOD

(71) Applicant: General Electric Company, Schenectady, NY (US)

(72) Inventors: Matthew John Malone, Lawrence Park, PA (US); Gregory Wright, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/690,008

(22) Filed: Apr. 17, 2015

(65) Prior Publication Data

US 2016/0304137 A1    Oct. 20, 2016

(51) Int. Cl.
*B62D 35/00*    (2006.01)
*B62D 35/02*    (2006.01)

(52) U.S. Cl.
CPC ........... *B62D 35/001* (2013.01); *B62D 35/004* (2013.01); *B62D 35/02* (2013.01)

(58) Field of Classification Search
CPC ..... B62D 35/001; B62D 35/004; B62D 35/02; B62D 37/02
USPC ............................................ 296/180.1–180.5
See application file for complete search history.

(56) References Cited

U.S. PATENT DOCUMENTS

| | | | |
|---|---|---|---|
| 3,399,632 A | 9/1968 | Dean | |
| 3,410,226 A | 11/1968 | Krupp | |
| 3,834,752 A * | 9/1974 | Cook | B62D 35/004 105/1.1 |
| 3,945,677 A * | 3/1976 | Servais | B62D 35/004 105/1.1 |
| 4,611,847 A * | 9/1986 | Sullivan | B62D 35/001 296/180.2 |
| 4,688,841 A * | 8/1987 | Moore | B62D 35/001 296/180.4 |
| 9,145,177 B2 * | 9/2015 | Smith | B62D 35/001 |
| 2014/0361579 A1 * | 12/2014 | Alguera Gallego | B62D 35/001 296/180.2 |
| 2015/0115651 A1 * | 4/2015 | Conboy | B62D 35/004 296/180.2 |

FOREIGN PATENT DOCUMENTS

CA     1228506 A    10/1987

* cited by examiner

*Primary Examiner* — Jason S Daniels
(74) *Attorney, Agent, or Firm* — John A. Kramer; Global Patent Operation

(57) ABSTRACT

An aerodynamic control system includes a skirt assembly configured to be disposed between plural vehicles in a vehicle system formed from the plural vehicles with the vehicles separated by a spatial gap in the vehicle system. The skirt assembly can include a bladder configured to be inflated with a fluid by a fluid source disposed onboard the vehicle system to cause the skirt assembly to expand between the vehicles from a collapsed state to an expanded state such that the skirt assembly at least partially fills the spatial gap between the vehicles. The skirt assembly can reduce aerodynamic drag exerted on the vehicle system during movement of the vehicle system relative to the vehicle system moving without the skirt assembly in the expanded state.

18 Claims, 14 Drawing Sheets

AERODYNAMIC CONTROL SYSTEM AND METHOD

FIELD

Embodiments of the subject matter disclosed herein relate to vehicles and vehicle systems.

BACKGROUND

One of the largest sources of revenue for North American railroads is the transport of intermodal freight. Economies of scale make rail transportation a cost-effective option for intermodal freight movement. In comparison to truck transport, railway intermodal transport can be more fuel efficient due to the low-friction, steel-on-steel interface between the wheel and rail; the closely coupled railcars; and the rolling stock capable of transporting multiple trailers and/or containers in a single unit.

Despite fuel efficiency improvements, intermodal freight rail can consume more fuel than other types of freight transportation. The increased fuel consumption is partially due to the high aerodynamic drag of intermodal trains caused by large gaps between loads and flow discontinuities within railcars, skin friction or surface shear, and/or lead vehicle wind resistance (e.g., the leading vehicle in the vehicle system along a direction of travel). This drag can require additional tractive effort to propel the railcars along a route. As the amount of tractive effort needed to propel the railcars increases, the fuel consumption of the trains also increases. Additionally, other types of vehicles suffer from drag forces. Automobiles such as semi-truck trailers also consume a significant amount of fuel due to drag forces exerted on the trailers in the gaps between the trucks and the trailers.

Some approaches to reducing drag on rail cars include adding rigid, aerodynamically shaped extensions to the railcars. These extensions change the shape of the ends of the cars in an attempt to reduce drag on the cars. But, adding and removing these extensions to the railcars requires additional time and effort, thereby increasing the time needed for transporting the cargo carried by the railcars. Additionally, storage of these extensions can require additional expense and the extensions can consume additional tractive effort and/or fuel to propel the railcars having the extensions.

BRIEF DESCRIPTION

In one embodiment, a system (e.g., an aerodynamic control system) includes a skirt assembly configured to be disposed between plural vehicles in a vehicle system formed from the plural vehicles with the vehicles separated by a spatial gap in the vehicle system. The skirt assembly can include a bladder configured to be inflated with a fluid by a fluid source disposed onboard the vehicle system to cause the skirt assembly to expand between the vehicles from a collapsed state to an expanded state such that the skirt assembly at least partially fills the spatial gap between the vehicles. The skirt assembly can reduce aerodynamic drag exerted on the vehicle system during movement of the vehicle system relative to the vehicle system moving without the skirt assembly in the expanded state.

In another embodiment, another system (e.g., another aerodynamic control system) includes a skirt assembly configured to be disposed between plural vehicles in a vehicle system formed from the plural vehicles with the vehicles separated by a spatial gap in the vehicle system. The skirt assembly can include one or more flexible sheets configured to be coupled with the vehicles on opposite sides of the spatial gap such that the one or more flexible sheets at least partially enclose the spatial gap. The skirt assembly can reduce aerodynamic drag exerted on the vehicle system during movement of the vehicle system relative to the vehicle system moving without the skirt assembly.

In another embodiment, a system (e.g., an aerodynamic control system) comprises a skirt assembly configured for attachment to a vehicle chassis. The skirt assembly is configured, when attached to the vehicle chassis, to be expandable from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. The skirt assembly, when in the expanded state and during operation of the vehicle and the adjacent vehicle for movement along a route, is configured to no more than abut the adjacent vehicle and not be coupled to the adjacent vehicle.

In another embodiment, a vehicle (e.g., which includes an aerodynamic control system) includes a vehicle chassis and a skirt assembly attached to the vehicle chassis. The skirt assembly is configured to expand from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
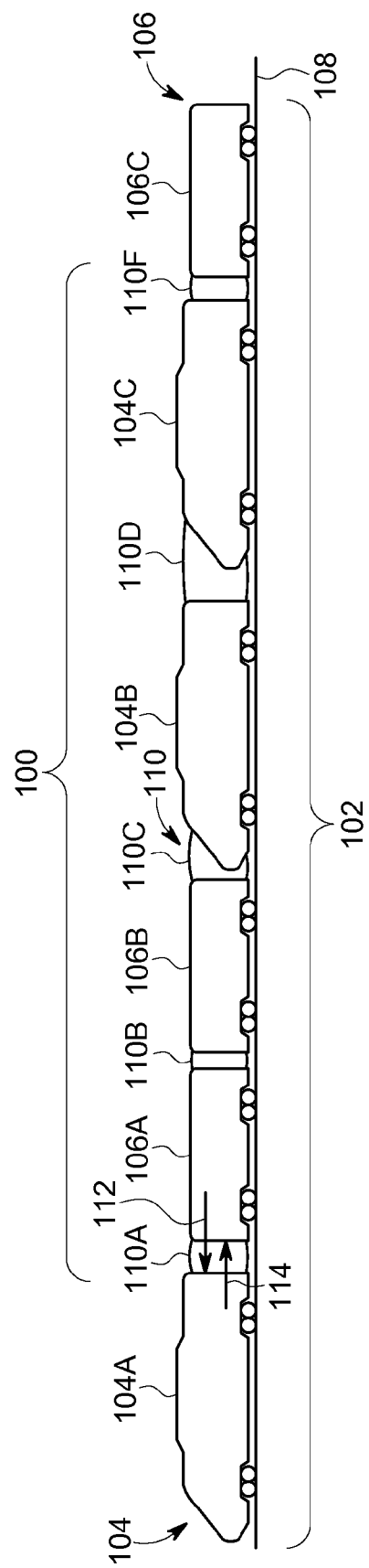
FIG. 1 illustrates a schematic diagram of an aerodynamic control system onboard a vehicle system according to one embodiment.

Embodiments of the subject matter described herein provide for systems and methods that control aerodynamics of vehicles and vehicle systems to reduce drag forces (e.g., drag) exerted on the vehicles and vehicle systems. Reducing drag on the vehicles or vehicle systems can improve fuel efficiency of the vehicles or vehicle systems and/or reduce emissions generated by the vehicles or vehicle systems relative to vehicles or vehicle systems that do not employ one or more of the embodiments described herein.

Aerodynamic drag includes forces that act on a solid object (such as a vehicle) in directions of relative fluid flow velocity (e.g., of ambient air). This drag can include form drag, which is the portion of the resisting force encountered by a body moving through a fluid that is due to the irregularity of shape of the body. Separation of air moving relative to the vehicle creates turbulence and results in pockets of low and high pressure that leave a wake behind the vehicle. Drag also includes skin friction, which is the friction acting on a solid body when the body is moving through a fluid associated with local wall shear stress The drag force exerted on a vehicle increases as the speed of the vehicle increases.

In one aspect of the subject matter described herein, an aerodynamic control system includes skirt assemblies disposed between opposing ends of vehicles in a vehicle system. These skirt assemblies may extend between the facing ends of the vehicles such that the skirt assemblies prevent the ingress of air, wind, etc., between the vehicles during movement of the vehicle system. The skirt assemblies may be formed from one or more bladders and inflation devices. When a bladder is enlarged through inflation, the bladder reduces aerodynamic drag exerted on the vehicle or vehicle system. In a vehicle system formed from two or more vehicles that are coupled with each other to travel along a route as a unit, the skirt assembly may be disposed between the vehicles such that inflation of the bladder fills space between the vehicles to reduce the drag exerted on the vehicle system. For example, the inflated bladder can block the ingress of air into this volume. In a single vehicle or a vehicle system formed from a single vehicle, the skirt assembly may be disposed on a trailing end of the vehicle (e.g., relative to a direction of travel) such that inflation of the bladder enlarges the size of the trailing end of a combination of the vehicle and the bladder in order to reduce the drag exerted on the vehicle.

The bladder may be inflated through a variety of techniques, such as by a compressor that fills the bladder with air or another fluid, by directing fluid from an air brake or brake pipe of the vehicle system into the bladder, by directing exhaust from the vehicle or vehicle system into the bladder, by directing ambient air into the bladder through one or more vents (e.g., such that movement of the vehicle or vehicle system causes the air to enter into the bladder via the vents), or the like. The bladder may be flexible such that, during changes in distances between neighboring vehicles in a vehicle system, the bladder may change shape to adapt to the changing distances between the vehicles. For example, during travel on a straight segment of a route, the trailing end of a leading vehicle and the leading end of a trailing vehicle may be separated by a first distance. But, during travel on a curved segment of the route, one side (e.g., the left side) of the trailing end of the leading vehicle may be closer to the leading end of the trailing vehicle relative to the opposite side (e.g., the right side) of the trailing end of the leading vehicle. The flexible bladder may change shape to match the changing distances such that the bladder fills or substantially fills the volume between the vehicles.

In another aspect, the skirt assemblies that reduce drag can be connected with ends of neighboring vehicles that face each other in a vehicle system. The skirt assemblies may be formed from one or more flexible sheets that are connected with the facing ends of the neighboring vehicles. These sheets can form an enclosure or enclosed volume between the neighboring vehicles. This enclosure can prevent ingress of air between the neighboring vehicles to reduce drag on the vehicle system. The sheets may be coupled with the neighboring vehicles in a variety of manners, such as container clips, suction cups, latches, hooks and loops or holes, or the like. Optionally, the sheets may be stored onboard one of the neighboring vehicles, such as in a spool around a cylinder, so that the sheets can be unrolled (e.g., manually or autonomously) between the neighboring vehicles to form the enclosure. Alternatively, the sheets may be coupled to a rigid frame that is either fixed in location between the neighboring vehicles or that moves from one vehicle toward the other vehicle to move the sheets around the volume between the vehicles to form the enclosure. In another embodiment, the sheets may be connected with a flexible frame that is capable of changing shape. The flexible frame can be actuated (e.g., manually and/or autonomously) to cause the sheets to extend between the vehicles (e.g., in an expanded state) and form the enclosure to reduce drag, or to retreat back from one of the vehicles (e.g., to a retracted state) to no longer form the enclosure (e.g., for storage). The ability to actuate the frame via an external control (e.g., in a cabin of a vehicle) can allow for manual control of collapsing or deflating the skirt assembly during strong winds, changes in speeds of the vehicle, and/or changes in routes being traveled upon (e.g., curves along the route). Automatic control of the frame also can allow for collapsing of the skirt assembly during strong winds, changes in speeds of the vehicle, and/or changes in routes being traveled upon. For example, detection of wind speeds above a designated threshold (e.g., by a wind speed sensor onboard the vehicle), detection of vehicle speeds above a designated threshold (e.g., by a tachometer or other vehicle speed sensor), a determination that the vehicle is traveling over or approaching a section of the route having one or more curves with a radius of curvature that is smaller than a designated threshold (e.g., by reference to a location determining device, such as a global positioning system receiver, and a database storing curvatures of the route), or the like, can cause the frame to be automatically collapsed by one or more motors or other devices.

At least one technical effect achieved by the inventive subject matter described herein includes the reduction of aerodynamic drag forces exerted on a vehicle or vehicle system during movement by filling gaps between neighboring vehicles in the vehicle system or by changing a shape of a trailing end of a single vehicle. The gaps may be filled and/or the shape of the trailing end may be changed using one or more embodiments of an inflation device and/or enclosure device. Filling these gaps and/or changing the shape of the trailing ends of the vehicles can increase fuel efficiency and/or reduce emission generation relative to vehicles or vehicle systems that do not fill these gaps and/or change the shapes of trailing ends of the vehicles.

FIG. 1 illustrates a schematic diagram of an aerodynamic control system 100 onboard a vehicle system 102 according to one embodiment. The vehicle system 102 includes multiple vehicles 104, 106 that are mechanically coupled with each other, such as by couplers (not shown due to presence of the aerodynamic control system 100), to travel along together along a route 108 (e.g., a road, track, or the like). The vehicle system 102 alternatively may be referred to as a vehicle consist.

The vehicles 104 may be referred to as propulsion-generating vehicles 104 and the vehicles 106 may be referred to as non-propulsion-generating vehicles 106. The vehicles 104 represent vehicles that are capable of generating propulsion or tractive effort to move the vehicles 104 in the vehicle system 102, such as locomotives, automobiles, or other types of propulsion-generating vehicles. The vehicles 106 represent non-propulsion-generating vehicles, such as rail cars, trailers, or the like. The vehicles 104 include three vehicles 104A-104C, but optionally may include a smaller or greater number of vehicles 104. The vehicles 106 include three vehicles 106A-106C, but optionally may include a larger or smaller number of vehicles 106. The arrangement and/or number of the vehicles 104 and/or vehicles 106 shown in FIG. 1 may deviate from the illustrate embodiment. In one embodiment, the vehicle system 102 can represent a rail vehicle consist, such as a train, but alternatively may represent a series of trucks and/or trailers. For example, the vehicle 104A may represent an automotive truck that is connected with and pulls a trailer (e.g., the vehicle 106A).

The aerodynamic control system 100 includes several skirt assemblies 110 (e.g., skirt assemblies 110A-F) disposed between neighboring vehicles 104, 106 of the vehicle system 102. The skirt assemblies 110 extend between a trailing end 112 of a leading vehicle 104, 106 (e.g., along a direction of travel of the vehicle system 102) and an opposing leading end 114 of a trailing vehicle 104, 106 to prevent ingress of air into the volume between these ends 112, 114 of the vehicles. In one embodiment, the skirt assemblies 110 include bladders that are at least partially filled with a fluid (such as air) to extend between the ends 112, 114 of the vehicles 104, 106 that face each other. Alternatively, the skirt assemblies 110 may include sheets of material that extend from one end 112 or 114 to the other end 114 or 112 of the neighboring vehicles 104, 106 to form the assembly 110.

While only a single skirt assembly 110 is shown between neighboring vehicles 104 and/or 106, alternatively, two or more skirt assemblies 110 may be located between neighboring vehicles 104 and/or 106. For example, two or more skirt assemblies 110 may be vertically stacked on top of each other such that the total height of the multiple skirt assemblies 110 is greater than that of a single skirt assembly 110.

Figure 2:
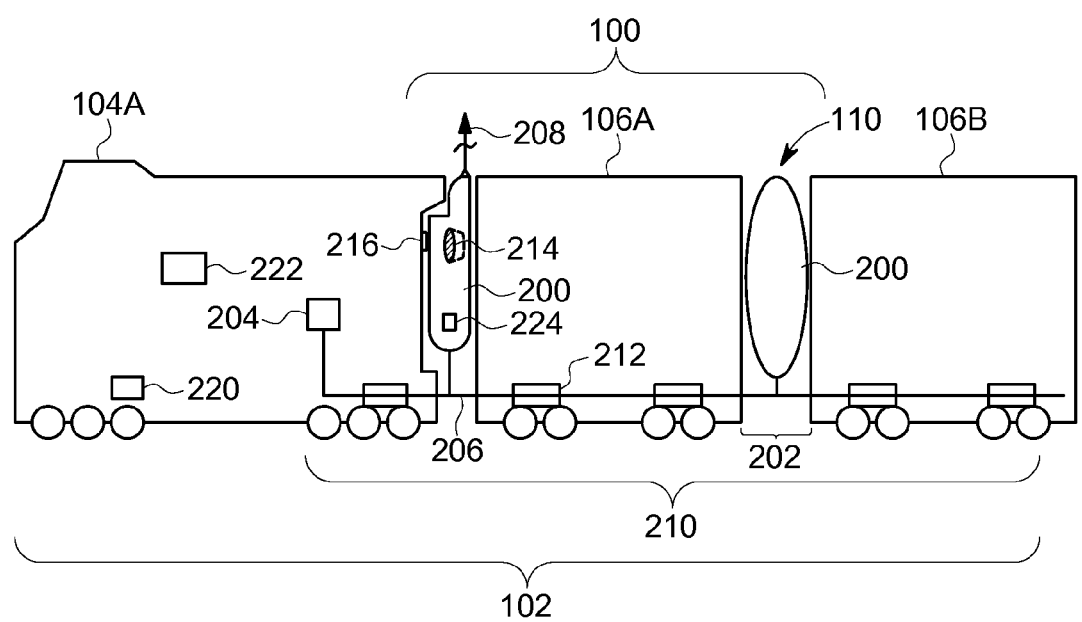
FIG. 2 illustrates one embodiment of the aerodynamic control system and a portion of the vehicle system shown in FIG. 1.

FIG. 2 illustrates one embodiment of the aerodynamic control system 100 and a portion of the vehicle system 102 shown in FIG. 1. In the illustrated embodiment, the skirt assemblies 110 of the aerodynamic control system 100 include bladders 200 that are at least partially filled with air (or another fluid) to change shape. Each of bladders 200 may be formed from a single volume that is inflated with a fluid, or one or more of the bladders 200 may be formed from two or more volumes that are inflated with the fluid. The bladder 200 between vehicles 104 and/or 106 may inflate to fill or substantially fill (such as by filling at least 70%, 90%, 99%, or another proportion) a volume 202 that extends between the opposing ends 112, 114 of the neighboring vehicles 104 and/or 106. Alternatively, the bladder 200 may be inflated to extend around the volume 202 without filling all or substantially all of the volume 202. For example, the bladder 200 may be inflated to form a frame that extends around the outer boundaries of the volume 202 between the opposing ends 112, 114 of the vehicles 104 and/or 106, but that does not fill the portion of the volume 202 within the outer boundaries of the volume 202.

The bladders 200 can be fluidly coupled with a fluid source 204 by one or more conduits 206. The fluid source 204 can represent an air compressor, tank, or other source of fluid or pressurized fluid (e.g., air) that is forced into the bladders 200 via one or more of the conduits 206 to inflate the bladders 200. Optionally, multiple fluid sources 204 can be provided. For example, each bladder 200 may have a separate fluid source 204 that fills the bladder 200. The fluid source 204 can be controlled from inside of the vehicle system 102, such as by a controller 222 (shown in FIG. 2) disposed onboard the vehicle 104A. For example, the fluid sources 204 may be coupled with an input device, such as a button, lever, switch, pedal, touchscreen, or the like, disposed onboard the vehicles 104, 106 to allow for an operator to actuate the input device and cause the fluid sources 204 to inflate or deflate the bladders 200. Optionally, the fluid sources 204 may automatically operate to ensure that the bladders 200 are filled with at least a threshold amount of air (e.g., a designated pressure). For example, one or more sensors 216, such as ultrasound transducers, radar detectors, touch-sensitive surfaces, or the like, can be disposed between the vehicles 104 and/or 106 to detect inflation of the bladder 200. An inflated bladder 200 may contact or come closer to the sensor than a bladder 200 that is deflated or that is inflated with less fluid. The distance from the sensor and/or lack of contact with the sensor can be used to detect whether the bladder 200 needs to be inflated. The ability to inflate and/or deflate the bladders 200 via an external control (e.g., in a cabin of a vehicle) can allow for manual control of collapsing or deflating the bladders 200 during strong winds, changes in speeds of the vehicle, and/or changes in routes being traveled upon. Automatic control of the frame also can allow for collapsing of the bladders 200 during strong winds, changes in speeds of the vehicle, and/or changes in routes being traveled upon. For example, a wind speed sensor 218 (e.g., an anemometer) can detect wind speeds above a designated threshold, a vehicle speed sensor 220 (e.g., a tachometer) can detect vehicle speeds above a designated threshold, an onboard controller 222 of the vehicle system 102 can determine that the vehicle is traveling over or approaching a section of the route having one or more curves with a radius of curvature that is smaller than a designated threshold, or the like. One or more of these detections or determinations can cause the controller 222 to automatically deflate the bladders 200. The controller 222 may be communicatively coupled with the sensors, fluid sources, and/or valves by one or more wired and/or wireless connections in order to allow the controller 222 to control and/or communicate with the sensors, fluid sources, and/or valves.

The bladders 200 may be fluidly coupled with each other (e.g., by one or more of the conduits 206), or may be separate from each other such that the fluid in one bladder 200 may not move into another bladder 200. One or more of the bladders 200 can include a valve 208 to vent at least some of the fluid inside the bladders 200. This valve 208 can represent a pressure relief valve or other type of valve. This valve 208 can open in response to fluid pressure in the bladder 200 or bladders 200 reaching or exceeding a designated threshold pressure to prevent the bladder 200 or bladders 200 from being overinflated and rupturing.

In the illustrated embodiment, the conduit 206 to which the bladders 200 are fluidly coupled represents a brake pipe of an air brake system 210 of the vehicle system 102. The air brake system 210 may maintain a fluid (e.g., air) pressure in the brake pipe above a designated threshold to prevent air brakes 212 onboard the vehicles 104, 106 from engaging to slow or stop movement of the vehicle system 102. Responsive to this pressure dropping below a designated activation pressure, the brakes 212 may engage to stop or slow movement of the vehicle system 102. Optionally, the air brake system 210 may be a system that supplies air from a compressor onboard a propulsion-generating vehicle 104 (e.g., a truck) to air brakes onboard a non-propulsion-generating vehicle 106 (e.g., a trailer).

The bladders 200 may be fluidly coupled with the brake pipe such that the bladders 200 bleed off or are otherwise inflated with some of the air used to prevent the brakes 212 from engaging or activating. During movement of the vehicle system 102, the fluid source 204 may supply air to the brake pipe and the bladders 200 to prevent the brakes 212 from engaging and to inflate the bladders 200. During engagement of the brakes 212, the pressure in the brake pipe may be decreased, which can at least partially deflate the bladders 200 during slowing or stopping of the vehicle system 102. Although the bladders 200 may deflate and thereby not be able to reduce drag on the vehicle system 102 in such a state, this drag may actually assist in stopping or slowing the vehicle system 102.

The conduit 206 can be fluidly coupled with the bladders 200 by one or more valves, such as flow limiting valves that restrict how much air can flow through the valves from the conduit 206 and into the bladders 200. These valves can restrict the air flow to prevent a leaking or ruptured bladder 200 from causing too much air to flow out of the brake system 210. Optionally, these valves can include one or more check valves that restrict the direction in which air can flow between the brake system 210 and the bladders 200. For example, the check valves can prevent air from flowing from the bladders 200 into the conduit 206, and may only permit air to flow from the conduit 206 to the bladders 200.

Additionally or alternatively, one or more of the bladders 200 may include a vent 214 that receives ambient air during movement of the vehicle system 102 to inflate the bladders 200. The vent 214 may include a portion of the bladder 200 that includes an opening into the bladder 200 and that optionally includes a raised body that extends away from the bladder 200 (e.g., and into areas where air moves relative to the vehicle system 102 during movement of the vehicle system 102). During time periods that the vehicle system 102 is moving slowly or is stationary, the bladders 200 may deflate because there is insufficient air to enter into and inflate the bladders 200. As the vehicle system 102 accelerates to a sufficiently fast speed to cause ambient air to enter into the bladder 200 via the vent 214, this air can inflate the bladder 200. The bladder 200 may be inflated by air passing through the vent 214 alone, by air provided from the brake system 210 alone, by air provided from a fluid source that is separate from the fluid source providing air to the brake system 210, or by a combination of two or more of these sources of air. In another aspect, part of the exhaust from one or more of the propulsion-generating vehicles 104 may be diverted or directed into one or more of the bladders 200 to inflate the bladders 200. For example, the exhaust from an engine of the vehicle 104 may partially enter into a conduit that directs at least part of the exhaust into one or more of the bladders 200.

The bladders 200 may be flexible so as to change shape and conform to changes in the gaps between neighboring vehicles 104, 106. A bladder 200 disposed between opposing ends 112, 114 of vehicles 104 and/or 106 may engage both ends 112, 114, or only one of the ends 112, 114. During turns of the vehicle system 102, the bladder 200 may change shape to conform to the changing size of the gap 202 between neighboring vehicles 104 and/or 106.

In one aspect, the controller 222 may monitor inflation of the bladders 200 to determine if one or more of the bladders 200 includes a leak. The controller 222 can be operably connected with one or more pressure and/or air flow sensors 224 that generate data representative of fluid pressure in the bladders 200 and/or air flow into the bladders 200. If the controller 222 detects pressure in a bladder 200 that is below a designated threshold, detects air flow into the bladder 200 that does not decrease after a time period in which the bladder 200 should be inflated, and/or detects air flow into the bladder 200 but no increase in the pressure in the bladder 200, then the controller 222 may determine that a tear, hole, or other damage to the bladder 200 is causing the fluid flowing into the bladder 200 to leak out of the bladder 200. In response, the controller 222 can stop the flow of fluid into the bladder 200, such as by closing a valve 208 that connects the brake line 206 with the bladder 200, deactivating a fluid source 204 that provides fluid to the bladder 200, or the like. In one embodiment, responsive to detecting a leak in a bladder 200, the controller 222 can notify an operator of the vehicle and/or an off-board location (e.g., a vehicle dispatch center, a repair facility, or the like) of the presence and/or location of the leak.

Figure 3:
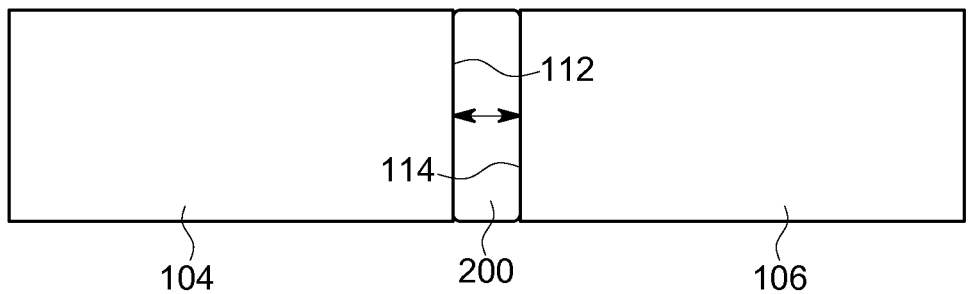
FIG. 3 illustrates a top view of one embodiment of a bladder disposed between neighboring vehicles during movement over a straight segment of a route.
Figure 4:
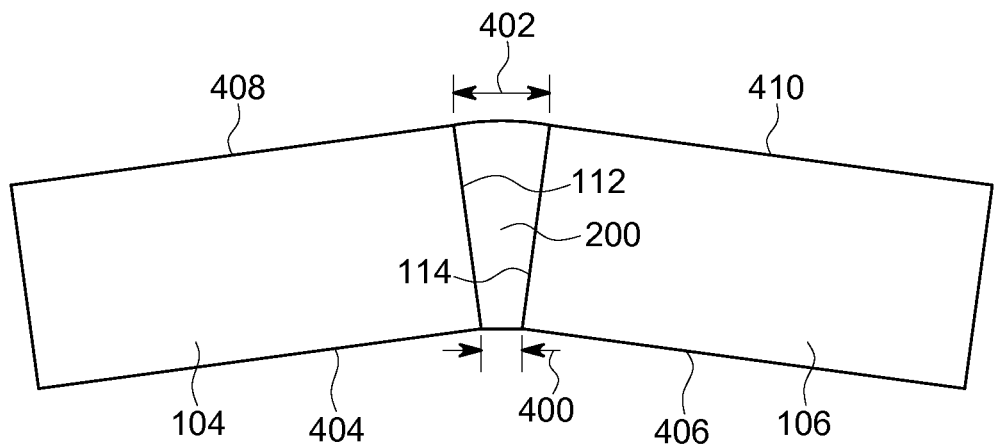
FIG. 4 illustrates a top view of one embodiment of a bladder disposed between neighboring vehicles during movement over a curved segment of the route.
Figure 5:
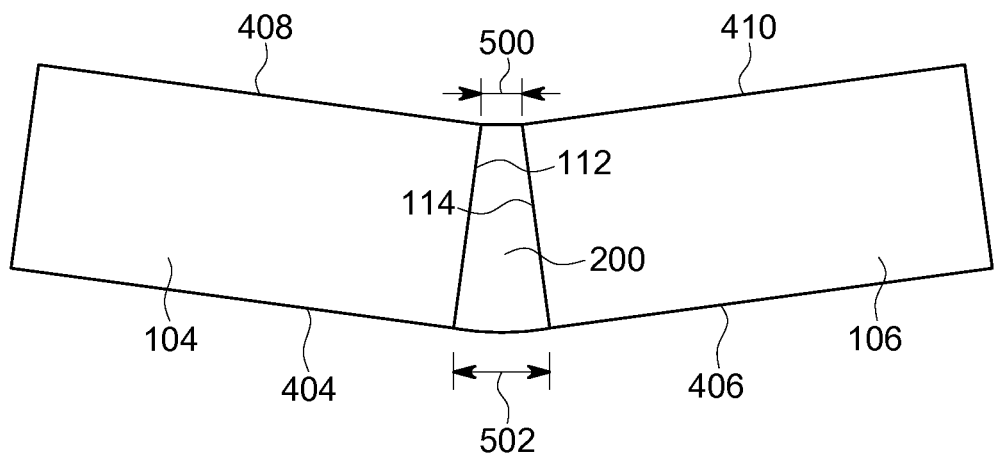
FIG. 5 illustrates a top view of one embodiment of the bladder disposed between neighboring vehicles during movement over another curved segment of the route.

FIG. 3 illustrates a top view of one embodiment of a bladder 200 disposed between neighboring vehicles 104, 106 during movement over a straight segment of the route 108. FIG. 4 illustrates a top view of one embodiment of a bladder 200 disposed between neighboring vehicles 104, 106 during movement over a curved segment of the route 108. FIG. 5 illustrates a top view of one embodiment of a bladder 200 disposed between neighboring vehicles 104, 106 during movement over another curved segment of the route 108. During travel over a straight, or linear, segment of the route 108 (e.g., FIG. 3), a separation distance 300 between the opposing ends 112, 114 of the vehicles 104, 106 may be constant or approximately constant across the ends 112, 114.

During travel over a curved segment of the route 108 (e.g., FIG. 4), the opposing ends 112, 114 of the vehicles 104, 106 may be closer to each other on one side (e.g., sides 404, 406 of the vehicles 104, 106 in FIG. 4). For example, a separation distance 400 between the ends 112, 114 of the vehicles 104, 106 at or closer to the sides 404, 406 of the vehicles 104, 106 may be smaller than the separation distance 300 and smaller than a separation distance 402 between the ends 112, 114 of the vehicles 104, 106 at or closer to the sides 408, 410. Similarly, during travel over a segment of the route 108 that curves in another direction (e.g., FIG. 5), the opposing ends 112, 114 of the vehicles 104, 106 may be closer to each other on one side (e.g., sides 408, 410 of the vehicles 104, 106 in FIG. 5). For example, a separation distance 500 between the ends 112, 114 of the vehicles 104, 106 at or closer to the sides 408, 410 of the vehicles 104, 106 may be smaller than the separation distance 300 and smaller than a separation distance 502 between the ends 112, 114 of the vehicles 104, 106 at or closer to the sides 404, 406.

The inflated bladder 200 may be sufficiently large to allow the bladder 200 to conform to the changing separation distances 300, 400, 402, 500, 502 between the opposing ends 112, 114 of the neighboring vehicles 104, 106. As a result, the bladder 200 can operate to reduce drag even as the vehicle system 102 travels on curved segments of the route 108.

Alternatively, the bladders 200 may at least partially deflate as the vehicles 104, 106 move along curved segments of the route. For example, an onboard system of the vehicle 104, 106 may determine when the vehicle 104, 106 is approaching or traveling on a curved segment of the route. This onboard system can include a global positioning system (GPS) receiver, a sensor that detects rotation of a steering wheel, a sensor that detects turning of wheels of the vehicle 104, 106, an anemometer (or other wind speed sensor) that detects wind speed, or the like. Responsive to determining that the vehicle 104, 106 is traveling on or approaching a curved segment of the route or that the wind speed exceeds a designated threshold, the fluid source 204 may stop supplying fluid to the bladders 200 to cause at least partial deflation of the bladders 200, one or more valves connected with the bladders 200 may open to vent fluid from the bladders 200, etc. The bladders 200 may be at least partially deflated to prevent damage to the bladders 200 during travel on the curved segments of the route. Additionally or alternatively, the bladders 200 may be at least partially deflated during high wind conditions to prevent tipping of the vehicles 104, 106 due to the moment arm generated when cross-winds encounter the inflated bladders 200.

Figure 6:
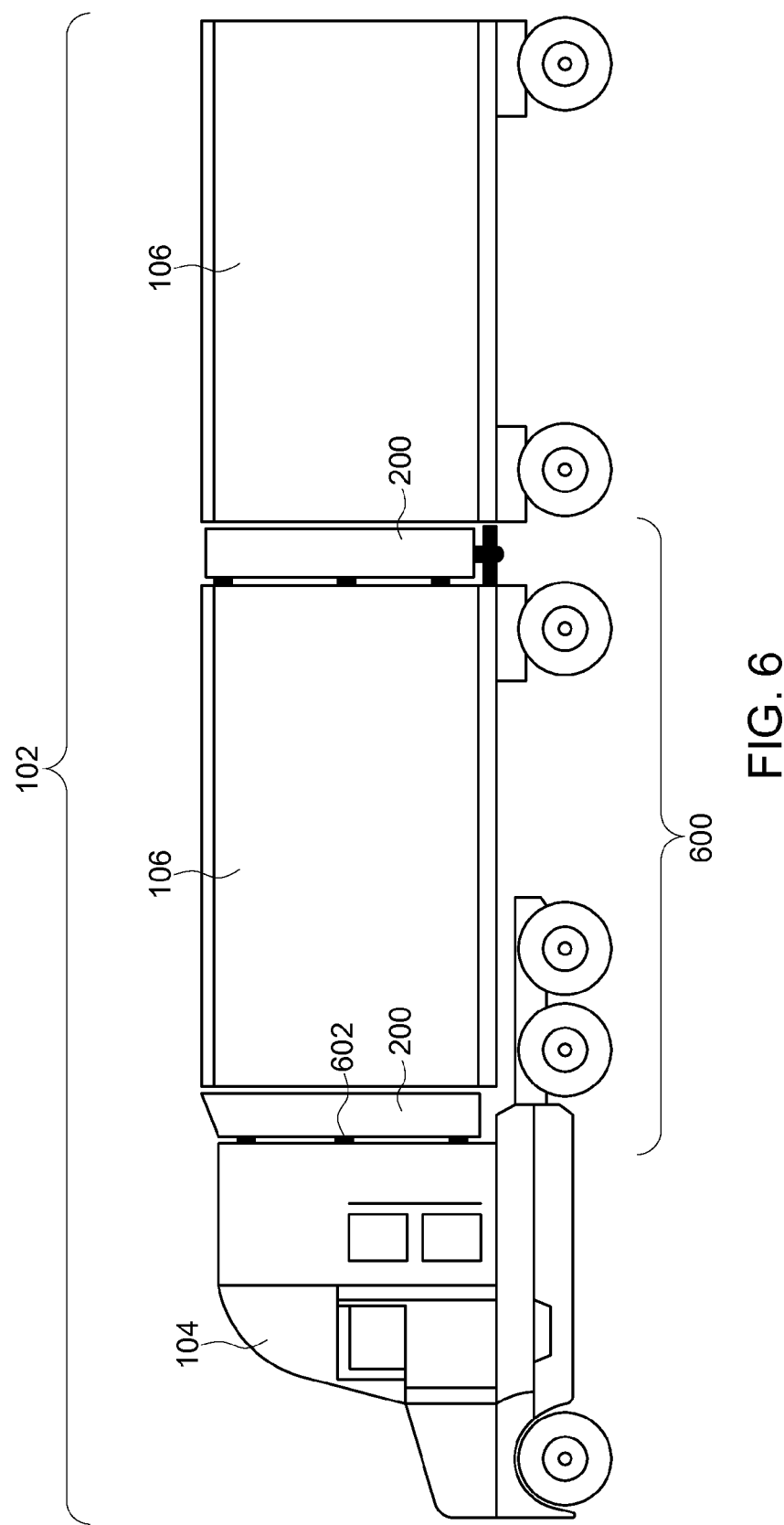
FIG. 6 illustrates another embodiment of an aerodynamic control system.

FIG. 6 illustrates another embodiment of an aerodynamic control system 600. The aerodynamic control system 600 is shown in connection with a vehicle system 102 having a propulsion-generating vehicle 104 (e.g., an automobile or truck) and non-propulsion-generating vehicles 106 (e.g., a trailer). While the vehicles 104, 106 are shown as a semi-truck and trailer, alternatively, the vehicles 104, 106 can represent rail vehicles or other types of vehicles. Additionally, a different number of the vehicle 106 may be provided instead of the two shown in FIG. 6.

As described above, enclosure devices 110 such as bladders 200 may be disposed between the vehicle 104 and the vehicles 106 and/or between the vehicles 106. The bladders 200 may be coupled with the vehicle 104 and/or the vehicles 106 by connector assemblies 602. Although not shown in FIGS. 1-5, the connector assemblies 602 may be used to connect the bladders 200 shown in FIGS. 1-5 to the vehicles 104, 106. The connector assemblies 602 may include suction cups, magnets, bolts, rivets, hooks and loops, clips, clamping straps, Velcro, tabs on the bladders 200 that are received into slots or openings on the vehicles, or the like. In one aspect, the bladders 200 may have tabs that move in an elongated slot vertically extending along the vehicle 104, 106. When deflated, the tabs of the bladders 200 may slide in the slot downward to a deflated state. During inflation, the tabs of the bladders 200 may slide upward in the slot to an inflated state. The connector assemblies 602 can allow for the bladders 200 to be removable from the vehicles 104, 106 such that the bladders 200 can be attached, removed, re-attached, and removed repeatedly without damaging or altering the vehicles 104, 106 and/or bladders 200.

Figure 7:
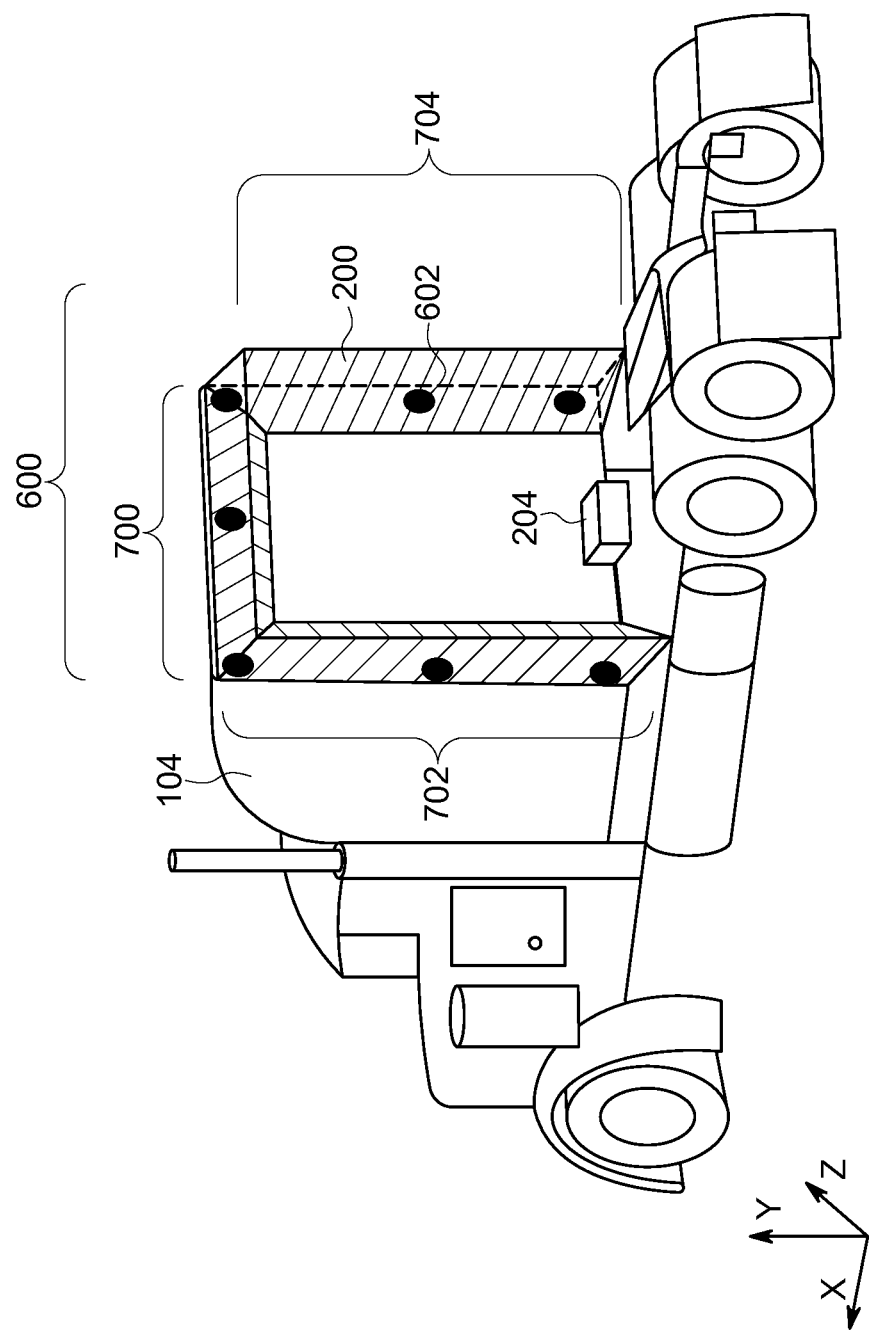
FIG. 7 is a rear view of the aerodynamic control system and propulsion-generating vehicle shown in FIG. 6 according to one embodiment.

FIG. 7 is a rear view of the aerodynamic control system 600 and propulsion-generating vehicle 104 shown in FIG. 6 according to one embodiment. The bladder 200 is fluidly coupled with and inflated by the fluid source 204, such as a compressor. In the illustrated embodiment, the fluid source 204 may not provide the fluid to another system, such as a brake system, of the vehicle 104.

In contrast to the bladders 200 that fill or substantially fill the gap between the vehicle 104 and the vehicle 106, the bladder 200 shown in FIG. 7 may extend around all or a part of the outer periphery of the gap, but not fill the gap. The bladder 200 shown in FIG. 7 may extend around and not completely fill the gap between the vehicle 104 and the vehicle 106 due to the presence of additional components between the vehicles 104, 106. For example, one or more wires, hitches, cables, compressors, or the like, may be located on a backside of the vehicle 104 that prevent the bladder 200 from completely filling in the gap.

In the illustrated example, the bladder 200 includes framing portions 700, 702, 704 that extend around the outer periphery of the gap between the vehicle 104 and the vehicle 106. The framing portions 702, 704 may be referred to as vertical framing portions in that the framing portions 702, 704 primarily extend along vertical directions along opposite sides of the gap between the vehicle 104 and the vehicle 106. The portions 700, 702, 704 may have outer dimensions that are larger in two directions than a third. For example, the portions 702, 704 may be larger along vertical directions (e.g., along the y-axis shown in FIG. 7) and directions that are parallel to directions of travel of the vehicle 104 (e.g., along the x-axis shown in FIG. 7) than in the horizontal direction (e.g., the thickness of the portions 702, 704 along the z-axis shown in FIG. 7). The portion 700 may be larger along the horizontal and directions that are parallel to the directions of travel of the vehicle 104 than in the vertical direction. The framing portion 700 can be referred to as a horizontal portion as the framing portion 700 primarily extends along a horizontal direction between the vertical framing portions 702, 704. In the illustrated example, the portions 700, 702, 704 form the shape of an upside down letter "U." Optionally, one or more additional vertical and/or horizontal framing portions may be included in the bladder 200 shown in FIG. 7.

The bladder 200 shown in FIG. 7 may be able to be inflated and deflated in less time than a bladder 200 that fills more of the space between the vehicles 104, 106. For example, the volume of the bladder 200 shown in FIG. 7 may be smaller than the volume of a bladder that includes the space between the portions 702, 704 and, as a result, can be filled or emptied of air faster than larger bladders 200.

The skirt assemblies 110 and bladders 200 described herein may be formed from one or more materials that reduce surface drag of the skirt assemblies 110. For example, the skirt assemblies 110 and bladders 200 may have textured rubber (e.g., rubber having dimples similar to those appearing on golf balls), a cross-linked fiber material with a low friction polymer coating, etc., on the outer surfaces of the skirt assemblies 110 and bladders 200 to reduce surface drag. The thickness of the material used to form the skirt assemblies 110 and bladders 200 may vary in different locations to allow parts of the skirt assemblies 110 and/or bladders 200 to expand during inflation.

Figure 8:
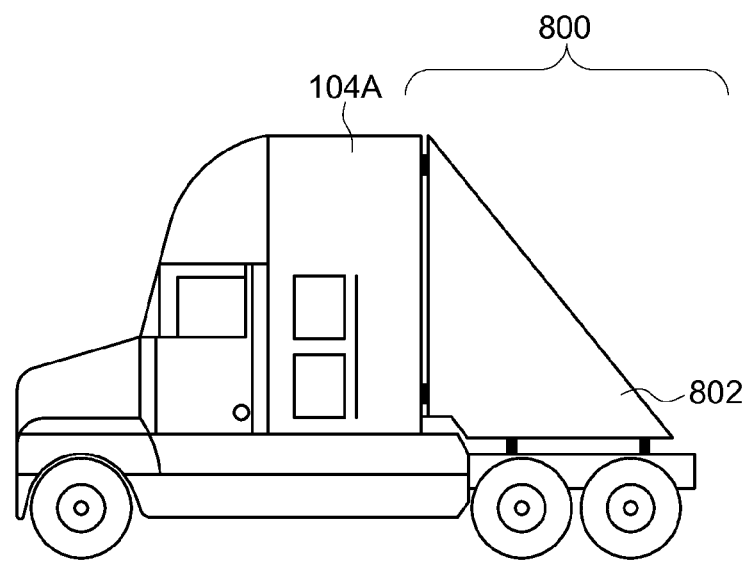
FIG. 8 illustrates another embodiment of an aerodynamic control system.

FIG. 8 illustrates another embodiment of an aerodynamic control system 800. The aerodynamic control system 800 includes a skirt assembly 802, such as an inflatable bladder, that is coupled with a trailing end 804 of a propulsion-generating vehicle 104A. In contrast to the aerodynamic control systems shown in FIGS. 1-7, the skirt assembly 802 of the system 800 shown in FIG. 8 is not disposed between two or more vehicles 104 and/or 106. Instead, the skirt assembly 802 can include an inflatable bladder disposed behind the vehicle 104A along a direction of travel of the vehicle 104A. The skirt assembly 802 changes the shape of vehicle 104A to reduce drag exerted on the vehicle 104A by air moving along the sides of and then behind the vehicle 104A during movement. In the illustrated embodiment, the skirt assembly 802 has a triangular shape, but alternatively may have another shape. The skirt assembly 802 can be inflated as described herein, such as by using one or more fluid sources, vents, or the like.

One or more embodiments of the bladders described herein may be deflated using one or more different techniques. For example, a vacuum included in the fluid source or separate from the fluid source may remove the fluid (e.g., air) from the bladders. As another example, a mechanical device, such as a loaded spring, may compress the bladders to squeeze the fluid out of the bladders. Such a device may compress the bladders in a manner similar to a tape measure rolling up a tape in order to deflate the bladders. Optionally, one or more vents, valves, or the like, may be opened to deflate the bladders.

Figure 9:
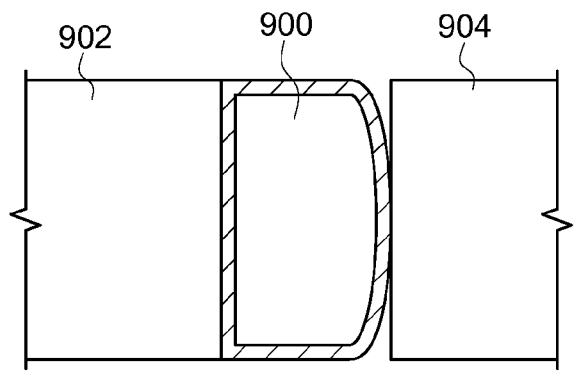
FIG. 9 illustrates a cross-sectional view of one embodiment of a dome-shaped bladder.
Figure 10:
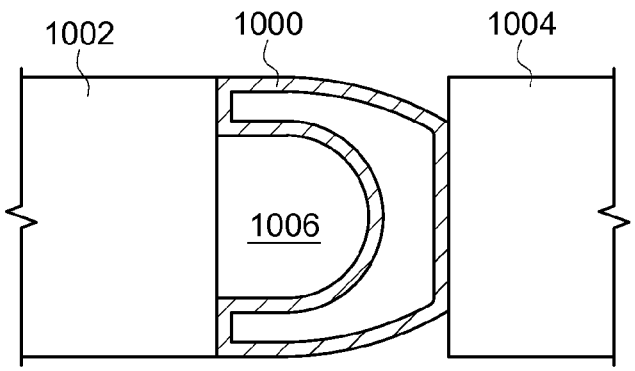
FIG. 10 illustrates a cross-sectional view of another embodiment of a donut-shaped bladder.

FIGS. 9 and 10 illustrate examples of cross-sectional shapes of bladders. FIG. 9 illustrates a cross-sectional view of one embodiment of a dome-shaped bladder 900 from above vehicles 902, 904 that the bladder 900 is disposed between. The bladder 900 can represent one or more of the bladders shown in FIGS. 1-8 and the vehicles 902, 904 can represent one or more of the vehicles 104, 106. The dome-shaped bladder 900 fills or substantially fills the gap 906 between the neighboring vehicles 902, 904 with the fluid (e.g., air) inside the bladder 900.

FIG. 10 illustrates a cross-sectional view of another embodiment of a donut-shaped bladder 1000 from above vehicles 1002, 1004 that the bladder 1000 is disposed between. The bladder 1000 can represent one or more of the bladders shown in FIGS. 1-8 and the vehicles 1002, 1004 can represent one or more of the vehicles 104, 106. The donut-shaped bladder 1000 extends around an open volume 1006 between the vehicle 104 and the bladder 1000. The bladder 1000 extends around the open volume 1006 such that this volume 1006 is contained within or defined by the vehicle 1002 and the bladder 1000. Bladders 1000 having this type of shape can have the same outer size as bladders that do not have such an open volume 1006 (e.g., the bladder 900) to reduce drag, but can include smaller volumes of fluid (e.g., air) inside the bladders 1000 such that inflating and/or deflating the bladders 1000 can occur faster than the bladders 900.

Figure 11:
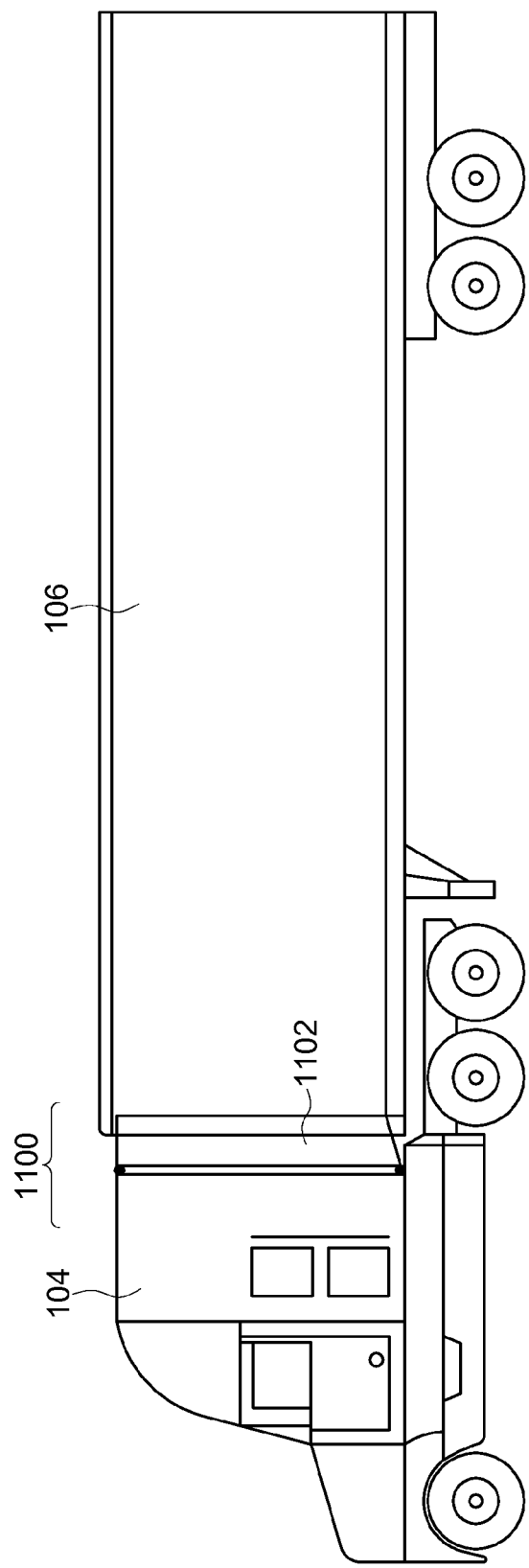
FIG. 11 illustrates another embodiment of an aerodynamic control system.

FIG. 11 illustrates another embodiment of an aerodynamic control system 1100. The aerodynamic control system 1100 is shown as being used in connection with a truck and trailer (as the vehicles 104, 106), but alternatively may be used in connection with other types of vehicles, such as rail vehicles, other automobiles, or the like. The aerodynamic control system 1100 includes a skirt assembly 1102 that is connected with, and extends between, the vehicles 104, 106. The skirt assembly 1102 can include flexible sheets that are connected with the vehicles 104, 106 by connector assemblies as described herein. These sheets can be formed from one or more of the materials used to form the bladders described herein.

Figure 12:
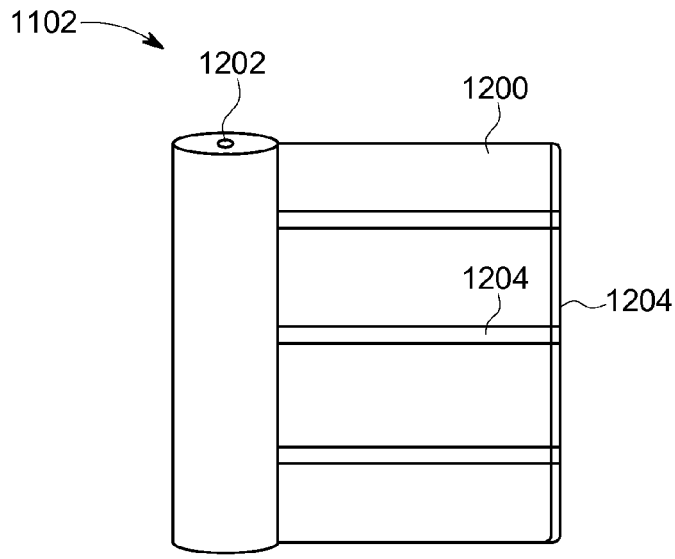
FIG. 12 illustrates the skirt assembly shown in FIG. 11.

FIG. 12 illustrates the skirt assembly 1102 shown in FIG. 11. The skirt assembly 1102 may include an elongated flexible sheet 1200 that can wind or unwind from a spool 1202. The spool 1202 can be mounted to the vehicle 104 or the vehicle 106, and one end of the sheet 1200 can be pulled away from the spool 1202 and connected to the other vehicle 106 or vehicle 104 to enclose one side of the gap between the vehicles 104, 106. The unwinding of the sheet 1200 from the spool 1202 can be performed manually (e.g., by an operator pulling on the sheet 1200) and/or automatically (e.g., by a motor rotating the spool 1202).

Additional spools 1202 and sheets 1200 can be disposed on other sides or edges of the vehicle 104 and/or 106 to allow for the sheets 1200 to be pulled across the gap between the vehicles 104, 106. The sheets 1200 can be pulled across this gap to form the skirt assembly 1102 that reduces air drag on the vehicles 104, 106. The sheets 1200 may be coupled with the vehicle 106 (or the vehicle 104) in a variety of manners, such as container clips, suction cups, latches, hooks and loops or holes, or the like. In the illustrated example, the sheet 1200 is coupled with and/or includes supporting members 1204. The members 1204 alternatively may be referred to as stiffening bodies. The supporting members 1204 may include curved, thin metal bodies (or another material) that can increase the rigidity of the sheet 1200 while also being capable of being rolled up onto the spool 1202. Alternatively, the sheet 1200 may not include or be coupled with the supporting members 1204. In one embodiment, one or more of the bodies 1204 may include a connector assembly, such as a magnet, that can couple the sheet 1200 to the vehicle 104 or 106.

In another embodiment, the sheet 1200 may not be wound and/or unwound from a spool 1202. For example, the sheet 1200 may be folded or otherwise stored and then extended between the vehicles 104, 106 when used to form the skirt assembly 1102.

Figure 13A:
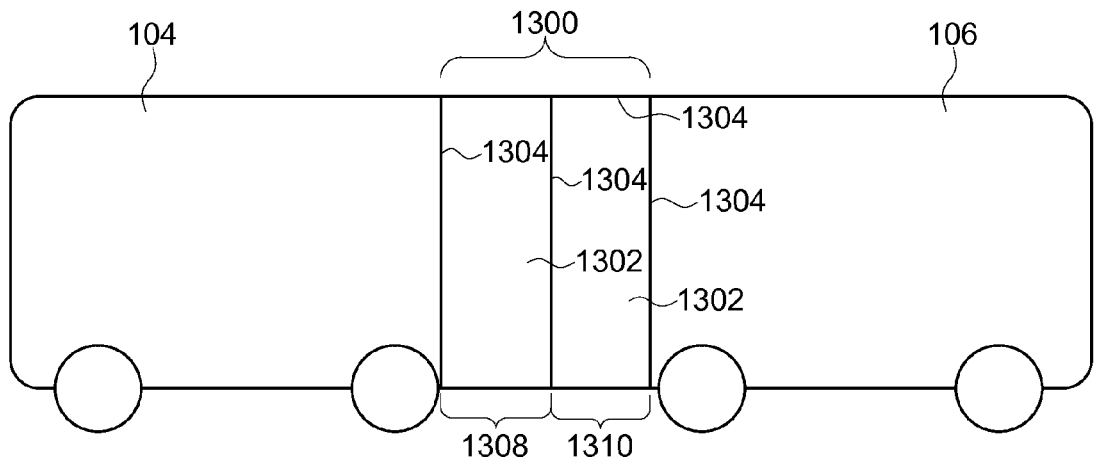
FIG. 13A illustrates another embodiment of an aerodynamic control system.

FIG. 13A illustrates another embodiment of an aerodynamic control system 1300. The aerodynamic control system 1300 includes a skirt assembly that is connected with, and extends between, the vehicles 104, 106. The skirt assembly can include flexible sheets 1302 that are connected with a rigid or semi-rigid frame 1304 that extends across the gap between the vehicles 104, 106. For example, the sheets 1302 can be connected with plastic, metal, or another material formed in the shape of the frame 1304. Alternatively, the frame 1304 may be formed from flexible and/or elastic materials, such as bungee cords, to allow the size of the skirt assembly to change as the size of the gap between the vehicles 104, 106 changes.

The frame 1304 may include two or more portions 1308, 1310 that can telescope into one another. For example, the portions 1308, 1310 can have tubular shapes with a circular cross-sectional shape, a square cross-sectional shape, or another shape. One portion 1310 may be sized to fit inside of the other portion 1308 such that, when the size of the gap between the vehicles 104, 106 changes, the portion 1310 may slide relative to the other portion 1308 (e.g., into and/or out of the portion 1308) so that the skirt assembly encloses the gap to reduce drag even when the vehicles 104, 106 move closer together or farther apart. Alternatively, the frame 1304 may be formed as a single portion that does not telescope or slide into another portion.

In one embodiment, the frame 1304 may be used with one or more of the bladders described herein. For example, a bladder may be disposed within the space bounded by the frame 1304 between the vehicles such that the frame 1304 operates as a cage to prevent the bladder from moving outside of the vehicles.

Figure 13B:
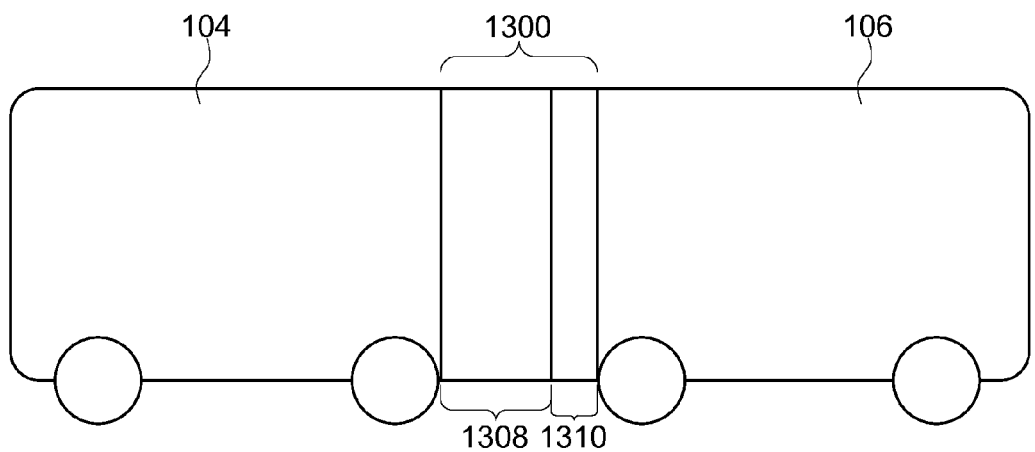
FIG. 13B illustrates movement of one portion of the skirt assembly into another portion of the skirt assembly shown in FIG. 13A.

FIG. 13B illustrates movement of one portion 1310 of the skirt assembly 1302 into another portion 1308 of the skirt assembly 1302. During time periods that the vehicles 104, 106 move closer to each other, the portion 1310 may slide or otherwise move to telescope into the portion 1308 to adapt to the changing size of the spatial gap between the vehicles 104, 106. If the vehicles 104, 106 move away from each other, the portion 1310 may slide or otherwise move out of the portion 1308 to adapt to the changing size of the gap between the vehicles 104, 106.

Figure 14:
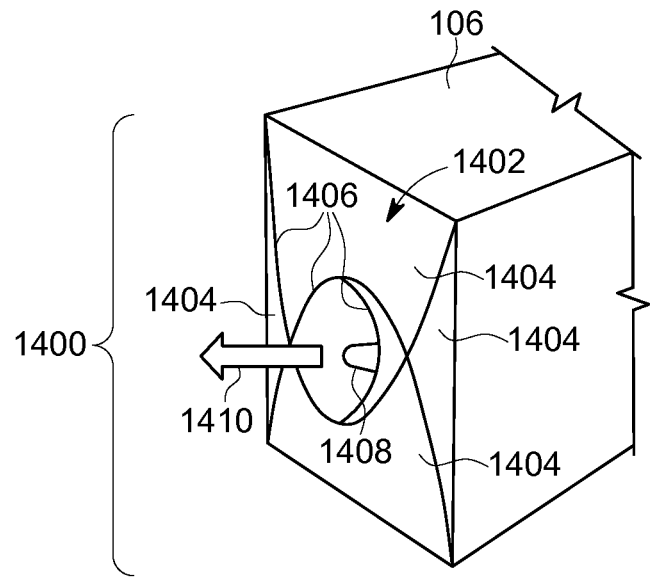
FIG. 14 illustrates another embodiment of an aerodynamic control system in a retracted or collapsed state.
Figure 15:
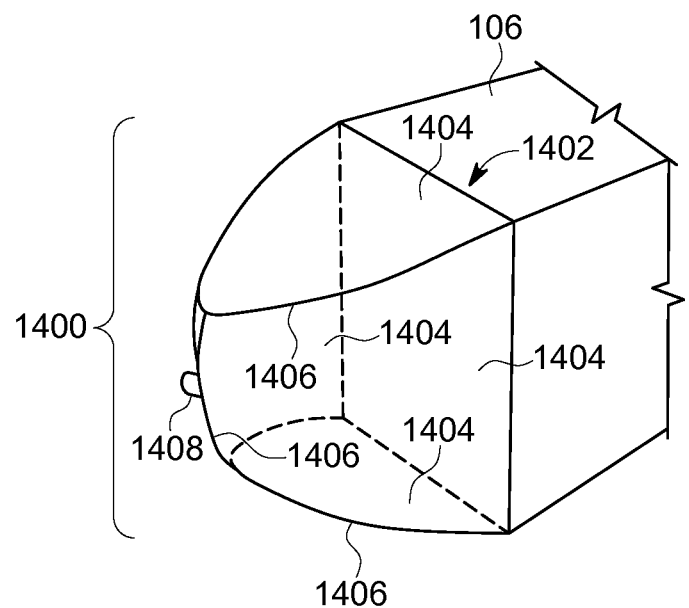
FIG. 15 illustrates the aerodynamic control system shown in FIG. 14 in an expanded state.

FIG. 14 illustrates another embodiment of an aerodynamic control system 1400 in a retracted or collapsed state. FIG. 15 illustrates the aerodynamic control system 1400 in an expanded state. The aerodynamic control system 1400 includes a skirt assembly 1402 that is connected with at least one of the vehicles 104, 106. While only the vehicle 106 is shown in FIGS. 14 and 15, the vehicle 104 may be positioned relative to the vehicle 106 such that the skirt assembly 1402 is disposed between the vehicles 104, 106.

The skirt assembly 1402 includes one or more flexible sheets 1404 connected with elongated frame members 1406. The frame members 1406 may be flexible or rigid materials, such as tent tubes or poles, which are connected with the vehicle 106. The frame members 1406 optionally may be connected with a handle 1408 to allow for an operator to pull on the handle 1408 to change the state of the skirt assembly 1402 from the collapsed state shown in FIG. 14 to the expanded state shown in FIG. 15. Responsive to pulling on the handle 1408 (e.g., in a direction 1410 away from the vehicle 106), the frame members 1406 can lock into positions to maintain the expanded state of the skirt assembly 1402 that is shown in FIG. 15. During movement of the vehicle 106, the expanded skirt assembly 1402 can change the shape of the leading end of the vehicle 106 so as to reduce drag exerted on the vehicle 106. Optionally, the expanded skirt assembly 1402 may fill or substantially fill the gap between the vehicles 104, 106 to reduce the drag exerted on the vehicle 106. The handle 1408 may be pushed back in toward the vehicle 106 to collapse the skirt assembly 1402 from the expanded state shown in FIG. 15 to the collapsed state shown in FIG. 14.

Figure 17:
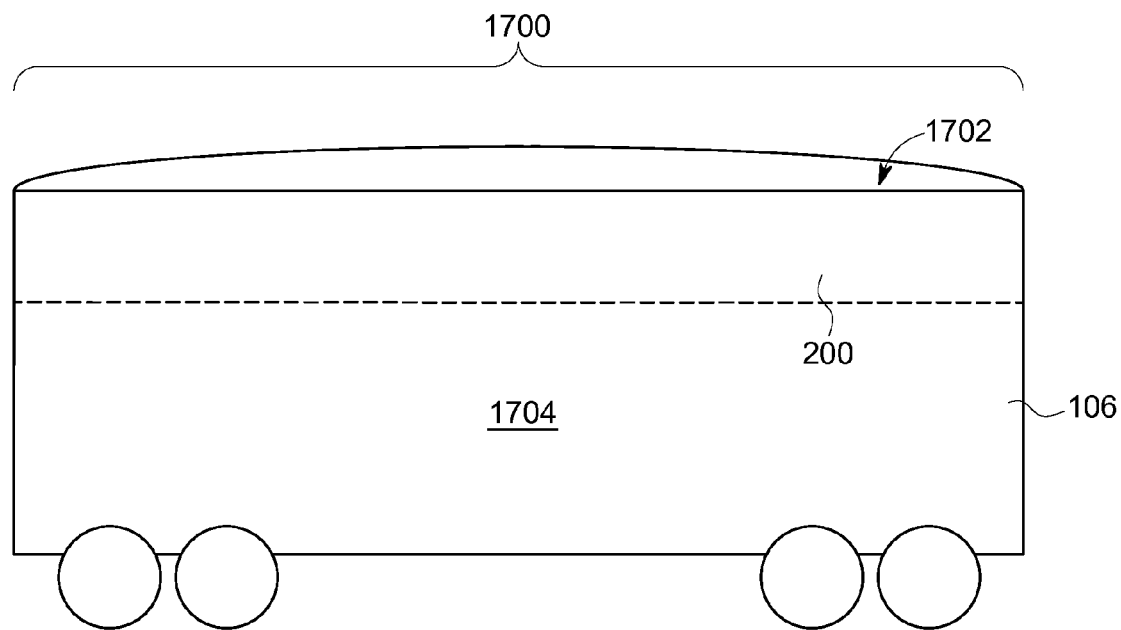
FIG. 17 illustrates another embodiment of a skirt assembly.

FIG. 17 illustrates another embodiment of a skirt assembly 1700. The skirt assembly 1700 includes one or more bladders 200 disposed onboard a non-propulsion-generating vehicle 106, such as a rail car or other vehicle. In one aspect, the vehicle 106 can represent a portion of a propulsion-generating vehicle 104. For example, the vehicle 106 can represent a bed or other storage area of a propulsion-generating vehicle, such as a pickup truck. The bladder 200 shown in FIG. 17 may be fluidly coupled with a fluid source such as an onboard compressor, a brake line, or the like (as described herein) and/or may include a vent to allow the bladder 200 to be inflated by movement of the vehicle 106, also as described herein.

The skirt assembly 1700 is disposed on the vehicle 106 in order to reduce aerodynamic drag exerted on the vehicle 106. The vehicle 106 may include an open top end 1702 that provides access into a storage volume 1704 where cargo may be loaded. During time periods that the volume 1704 is empty or is only partially filled with cargo (e.g., the cargo does not extend up to the end 1702 of the vehicle 106), air may enter into the volume 1704 and generate drag on the vehicle 106.

In order to reduce or eliminate this drag, the bladder 200 can be inflated to fill or at least partially fill the storage volume 1704. For example, the bladder 200 can be inflated to cover the end 1702 of the vehicle 106 or to fill or at least partially fill the area or volume that is framed by the end 1702 of the vehicle 106, as shown in FIG. 17. In such as state, the bladder 200 can prevent or reduce the air that enters into the volume 1704 and thereby reduce drag on the vehicle 106.

Figure 18:
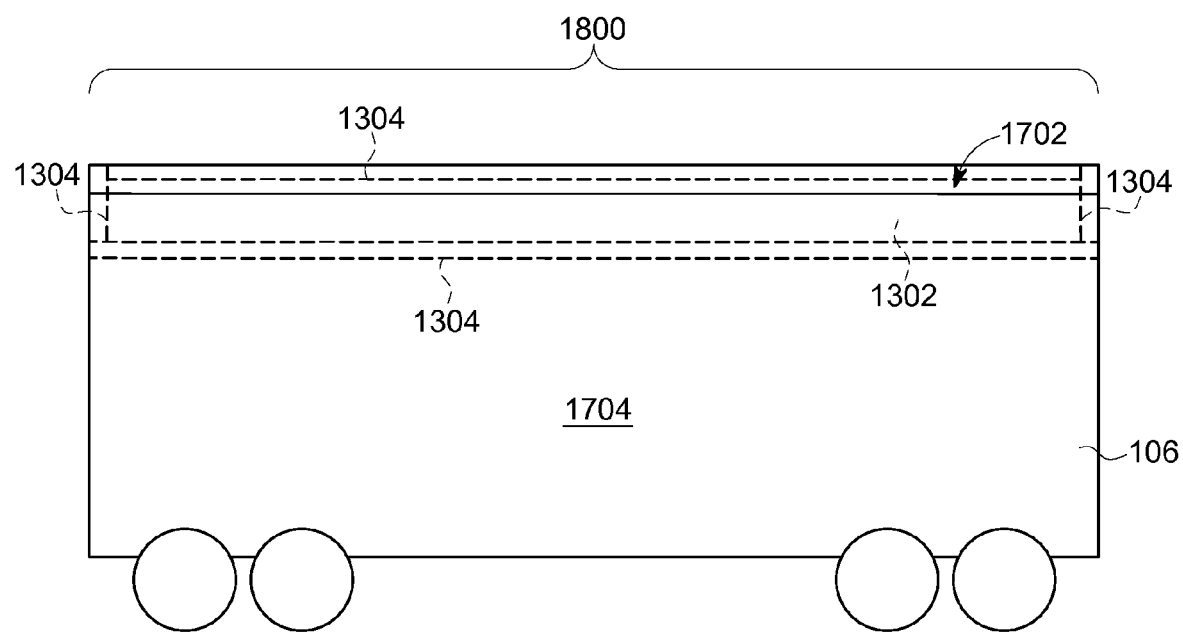
FIG. 18 illustrates another embodiment of a skirt assembly.

FIG. 18 illustrates another embodiment of a skirt assembly 1800. The skirt assembly 1800 includes one or more flexible sheets 1302 connected with and supported by frames 1304 onboard a non-propulsion-generating vehicle 106, such as a rail car or other vehicle. The skirt assembly 1800 is disposed on the vehicle 106 in order to reduce aerodynamic drag exerted on the vehicle 106. In order to reduce or eliminate the drag exerted on the vehicle 106 when the storage volume 1704 is at least partially empty, the frames 1304 can be extended across the open end 1702 of the vehicle 106 in order to extend the flexible sheets 1302 across the open end 1702. In such as state, the sheets 1302 can prevent or reduce the air that enters into the volume 1704 and thereby reduce drag on the vehicle 106.

One or more embodiments of the skirt assemblies disclosed herein may be connected to only one of two neighboring vehicles in a vehicle system formed from two or more vehicles. For example, a bladder may be permanently connected with one vehicle and then inflated to abut a neighboring vehicle. Alternatively, the skirt assembly may be coupled to both vehicles. In another aspect, the skirt assembly may not be connected to any vehicle, but may be connected with one or more components of the vehicle system that extend between vehicles (e.g., couplers). Alternatively, the skirt assembly may not be connected to the vehicles or vehicle system. For example, a bladder may be inflated such that the bladder is secured between neighboring vehicles by engaging the opposing ends of the vehicles. One or more connector assemblies may then be used to secure the bladder between the vehicles.

Figure 19:
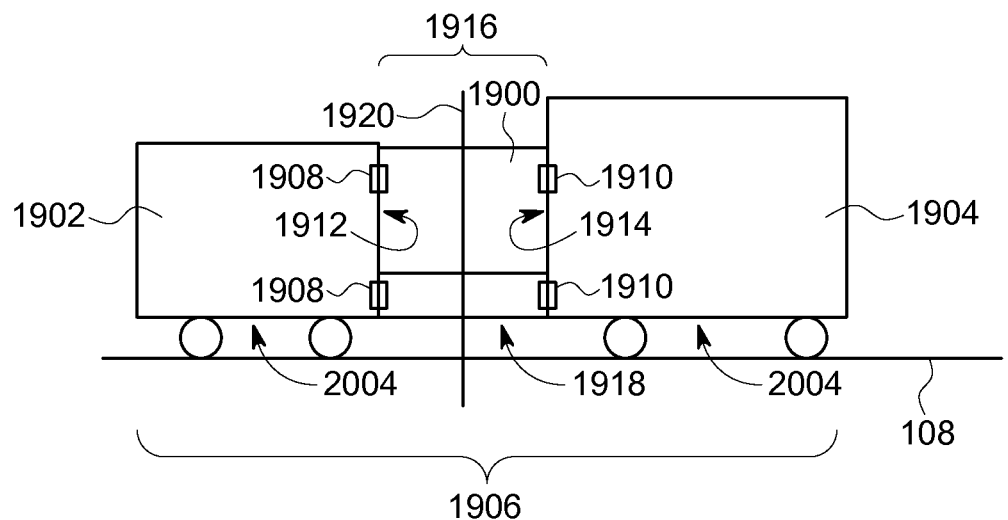
FIG. 19 illustrates another embodiment of a skirt assembly.

FIG. 19 illustrates another embodiment of a skirt assembly 1900. The skirt assembly 1900 includes one or more sheets, bladders, frames, or the like, as described herein in connection with FIGS. 1-18. The skirt assembly 1900 may be fastened or otherwise secured to one or more vehicles 1902, 1904 in a vehicle system 1906 having plural vehicles 1902, 1904 mechanically coupled with each other for travel along a route. The skirt assembly 1900 may be fastened to the vehicle 1902 and the vehicle 1904 by one or more connector assemblies 1908, 1910. The connector assembly 1908 secures the skirt assembly 1900 to the vehicle 1902 and the connector assembly 1910 secures the skirt assembly 1900 to the vehicle 1904. The vehicles 1902, 1904 have ends 1912, 1914 that face each other. The vehicles 1902, 1904 are spaced apart from each other such that a spatial gap 1916 exists and extends between the ends 1912, 1914. The gap 1916 is defined from the end 1912 to the end 1914. The gap 1916 may be defined by a coextensive end area of bodies of the vehicles 1902, 1904 and one or more distances between the bodies of the vehicles 1902, 1904 within the coextensive end area. These bodies may exclude wheels, wheel assemblies, bogies, trucks (in terms of rail vehicles), or the like, of the vehicles 1902, 1904. The coextensive end area represents the degree to which one end 1912 or 1914 of one of the vehicles 1902 or 1904 overlaps with an opposing end 1914 or 1912 of the other vehicle 1904 or 1902 from the perspective of a plane 1920 that is perpendicular to the upper surface of the route 108. The connector assemblies 1908, 1910 secure the skirt assembly 1900 to the vehicles 1902, 1904 in such a way that bulkhead areas of the vehicles 1902, 1904 are at least partially encompassed by the skirt assembly 1900.

Figure 20:
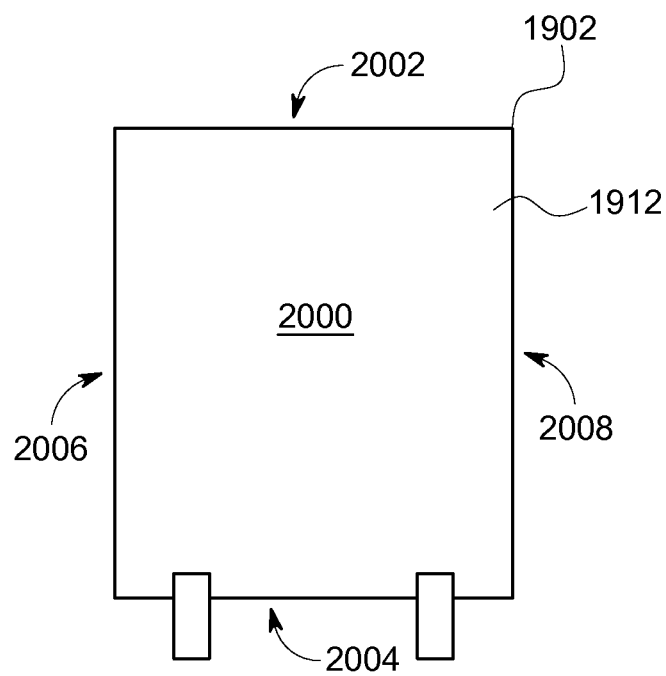
FIG. 20 illustrates a bulkhead area of the vehicle shown in FIG. 19 according to one embodiment.

With continued reference to FIG. 19, FIG. 20 illustrates a bulkhead area 2000 of the vehicle 1902 according to one embodiment. Optionally, FIG. 20 may illustrate the bulkhead area of the vehicle 1904 or another vehicle described herein. The bulkhead area 2000 represents the area of the vehicle 1904 that faces the other vehicle 1904. In one aspect, the bulkhead area 2000 represents the end 1912 of the vehicle 1902 (or the end 1914 of the vehicle 1904). The bulkhead area 2000 is bounded by an upper side 2002, an opposite lower side 2004, and opposite lateral sides 2006, 2008.

As shown in FIG. 20, the bulkhead area 2000 may be a solid object that does not include any passageways, openings, or the like. For example, the bulkhead area 2000 may not include a portal that allows an operator, other person, or object to pass through the end 1912. The bulkhead areas of the vehicles 1902, 1904 may not include any portals that allow an operator or other person to move from inside one vehicle 1902 or 1904 into the other vehicle 1904 or 1902. Alternatively, one or more of the bulkhead areas of the vehicles 1902, 1904 may include such a portal.

When the skirt assembly 1900 is coupled with the vehicles 1902, 1904, the skirt assembly 1900 may enclose a significant portion of the volume of the spatial gap 1916. This volume may be defined (e.g., bounded) by a coextensive end area of the ends 1912, 1914 of the vehicles 1902, 1904, a lower plane 1918 extending from the lower side 2004 of one vehicle 1902 or 1904 toward the lower side 2004 of the other vehicle 1904 or 1902, an upper plane 1920 extending from the upper side 2002 of one vehicle 1902 or 1904 toward the upper side 2002 of the other vehicle 1904 or 1902, a first side plane extending from the lateral side 2006 of one vehicle 1902 or 1904 toward the lateral side 2006 of the other vehicle 1904 or 1902 (and on the same side of the vehicle system 1906), and a second side plane extending from the lateral side 2008 of one vehicle 1902 or 1904 toward the lateral side 2008 of the other vehicle 1904 or 1902 (and on the same side of the vehicle system 1906). The skirt assembly 1900 may extend around and enclose a different portion of this volume, such as at least 90%, at least 80%, at least 70%, at least 60%, at least 50%, or the like, of the volume.

Figure 21:
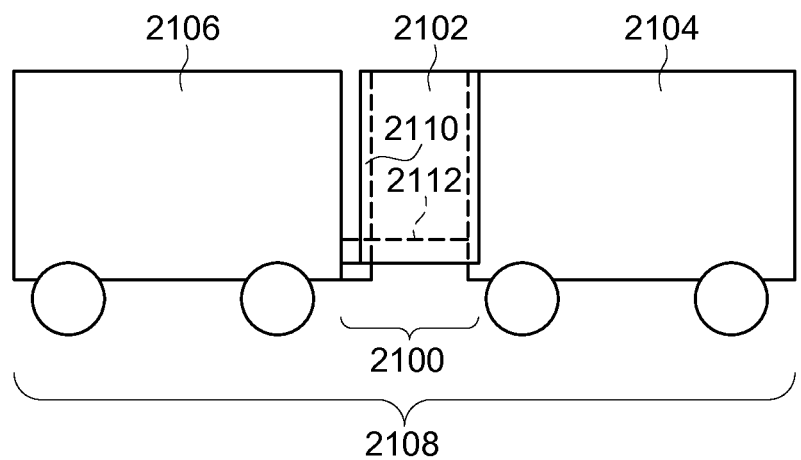
FIG. 21 illustrates an aerodynamic control system according to another embodiment.

FIG. 21 illustrates an aerodynamic control system 2100 according to another embodiment. The system 2100 includes a flexible skirt assembly 2102, such as a flexible sheet, that is connected to one vehicle 2104 of a vehicle system 2108 having at least the vehicle 2104 and one or more other vehicles 2106 mechanically coupled with each other (e.g., by couplers 2112). The vehicles 2104, 2106 may represent one or more of the vehicles shown and/or described herein. One or more connector assemblies (not shown in FIG. 21) as described herein may be used to secure the skirt assembly 2102 to the vehicle 2104.

Figure 22:
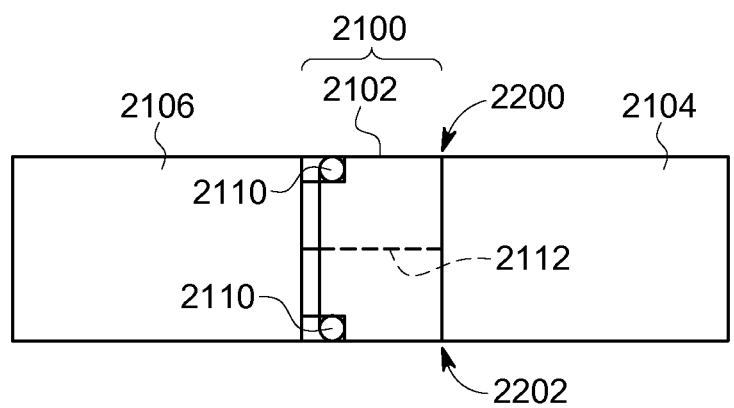
FIG. 22 illustrates a top view of the aerodynamic control system shown in FIG. 21.

With continued reference to FIG. 21, FIG. 22 illustrates a top view of the aerodynamic control system 2100 shown in FIG. 21. The skirt assembly 2102 may be connected with the other vehicle 2106 via support bodies 2110. The support bodies 2108 include vertically elongated bodies, such as posts, cylinders, tracks, guides, or the like, in the illustrated embodiment. The skirt assembly 2102 can be wrapped around outer surfaces of the support bodies 2108 such that opposite ends 2200, 2202 of the skirt assembly 2102 are fastened to the vehicle 2104 and the skirt assembly 2102 extends around the support bodies 2108.

The skirt assembly 2102 may have a fixed length from the end 2200 to the end 2202 of the skirt assembly 2102. While this length may vary slightly (e.g., less than 10%, less than 5%, or the like) before the skirt assembly 2102 tears or is otherwise damaged, the length of the skirt assembly 2102 may be relatively constant.

Figure 23:
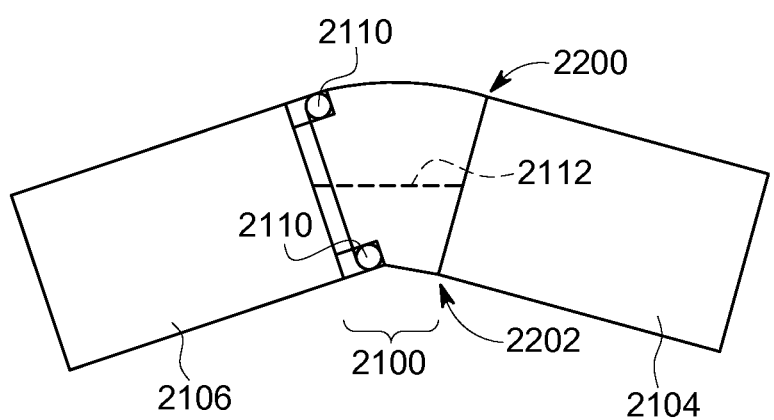
FIG. 23 illustrates operation of the aerodynamic control system shown in FIG. 21 during movement of the vehicle system shown in FIG. 21 around a curved portion of the route according to one embodiment.

FIG. 23 illustrates operation of the aerodynamic control system 2100 during movement of the vehicle system 2108 around a curved portion of the route according to one embodiment. As the vehicle system 2108 moves over a curved portion of the route, one of the support bodies 2110 may move farther from the vehicle 2104 while the other support body 2110 moves closer to the vehicle 2104. The skirt assembly 2102 may slide along the outer surfaces of the support bodies 2110 while remaining connected with the vehicle 2104 so that the skirt assembly 2100 encloses much or all of the volume between the vehicles 2104, 2106 to reduce drag on the vehicle system 2108 without the skirt assembly 2102 including a bladder or other inflatable structure, or without a rigid structure. Because the skirt assembly 2100 can slide on the support bodies 2110, the fixed length of the skirt assembly 2100 can allow the portion of the skirt assembly 2100 between the end 2200 and one of the support bodies 2110 to increase in length while the portion of the skirt assembly 2100 between the end 2202 and the other support body 2110 to decrease in length by a similar or identical amount.

Figure 16:
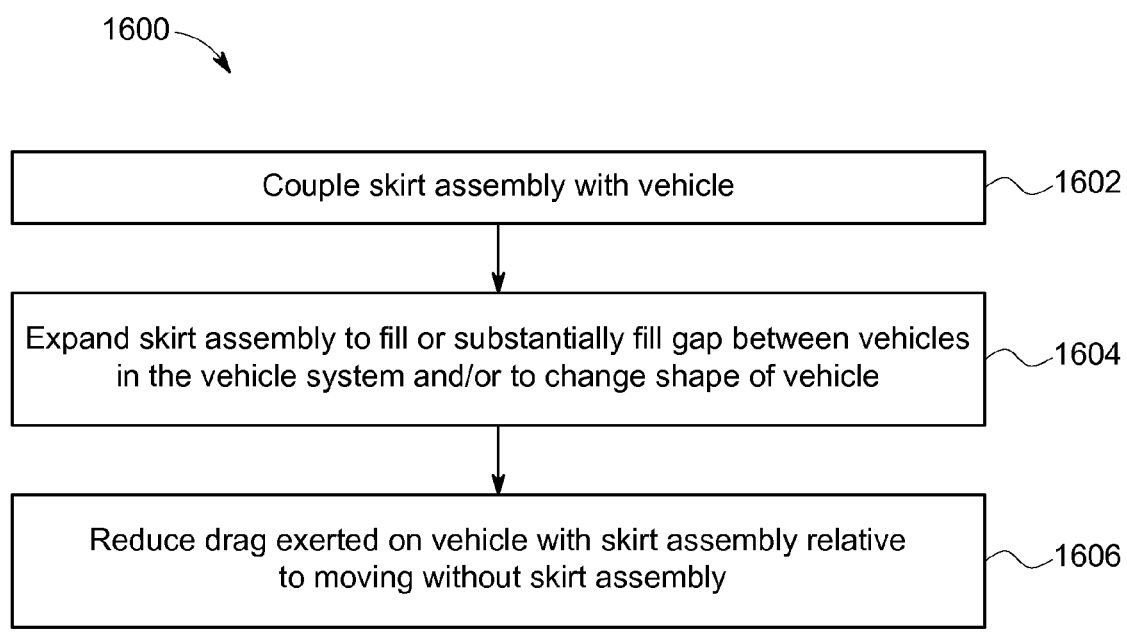
FIG. 16 illustrates a flowchart of one embodiment of a method for reducing aerodynamic drag exerted on a vehicle.

FIG. 16 illustrates a flowchart of one embodiment of a method 1600 for reducing aerodynamic drag exerted on a vehicle. The method 1600 may be performed using one or more embodiments of the aerodynamic control systems described herein. At 1602, a skirt assembly is coupled with a vehicle. The skirt assembly may include an inflatable bladder that is fluidly coupled with a fluid source (e.g., compressor) onboard the vehicle. Optionally, the skirt assembly may include flexible sheets coupled or interconnected with the vehicle. The vehicle may be included in a vehicle system (e.g., a vehicle consist) that includes two or more vehicles coupled with each other, or alternatively may be a stand-alone vehicle.

At 1604, the skirt assembly is expanded. Expansion of the skirt assembly can cause a gap between vehicles in a vehicle system to be filled or at least partially filled by the skirt assembly. This can reduce or eliminate the aerodynamic drag that otherwise would be exerted on the vehicles within the gap between the vehicles. Optionally, expansion of the skirt assembly can change the shape of a vehicle to reduce or eliminate the aerodynamic drag that otherwise would be exerted on the vehicle. The skirt assembly can be expanded by inflating a bladder of the skirt assembly with one or more fluids (e.g., air), by unrolling the skirt assembly across the gap between vehicles, by moving or sliding one portion of a frame assembly that supports flexible sheets of the skirt assembly across the gap between the vehicles, by pulling on a frame that supports the flexible sheets to change the skirt assembly from a retracted or collapsed state to an expanded state, or the like. In one embodiment, the skirt assembly is expanded prior to the vehicle system or vehicle beginning movement. Alternatively, the skirt assembly may be expanded during movement of the vehicle or vehicle system, such as by an operator or controller of the vehicle or vehicle system expanding the skirt assembly when fuel consumption of the vehicle or vehicle system increases, speed of the vehicle or vehicle system decreases, or the like, due to aerodynamic drag on the vehicle or vehicle system.

At 1606, aerodynamic drag on the vehicle or vehicle system is reduced by the skirt assembly during movement of the vehicle or vehicle system relative to movement of the vehicle or vehicle system without the expanded skirt assembly. As described above, the skirt assembly can fill, partially fill, or enclose the gap between vehicles, or change the shape of a vehicle, such that aerodynamic drag on the vehicle or vehicle system is reduced.

In one embodiment, a system (e.g., an aerodynamic control system) includes a skirt assembly configured to be disposed between plural vehicles in a vehicle system formed from the plural vehicles with the vehicles separated by a spatial gap in the vehicle system. The skirt assembly can include a bladder configured to be inflated with a fluid by a fluid source disposed onboard the vehicle system to cause the skirt assembly to expand between the vehicles from a collapsed state to an expanded state such that the skirt assembly at least partially fills the spatial gap between the vehicles. The skirt assembly can reduce aerodynamic drag exerted on the vehicle system during movement of the vehicle system relative to the vehicle system moving without the skirt assembly in the expanded state.

In one aspect, the system also can include a controller configured to monitor inflation of the bladder and to at least partially deflate the bladder responsive to one or more of determining that air speed outside of the vehicle system exceeds a first designated threshold, determining that the vehicle system is traveling toward one or more curves in a route, and/or determining that a moving speed of the vehicle system exceeds a second designated threshold.

In one aspect, the system also can include a controller configured to remotely control one or more of inflation or deflation of the bladder by the fluid source.

In one aspect, the controller can be configured to detect a leak in the bladder and, responsive to detecting the leak, to stop delivery of the fluid from the fluid source to the bladder.

In one aspect, the bladder can be configured to be fluidly coupled with an onboard compressor that controls inflation of the bladder by the fluid source.

In one aspect, the fluid source can include a brake line of an air brake system of the vehicle system and the fluid comprises air from the air brake system.

In one aspect, the bladder can include a vent configured to direct air that is moving relative to the vehicle system during the movement of the vehicle system from outside of the bladder into the bladder to at least partially inflate the bladder.

In one aspect, the bladder can include one or more flexible sheets configured to change shape during the expanded state of the skirt assembly such that the skirt assembly changes shape between the vehicles during the movement of the vehicle system along a curved segment of a route along which the vehicle system travels.

In one aspect, the bladder can be configured to be inflated such that the bladder engages both of the vehicles that the bladder is disposed between and at least substantially fills the spatial gap between the vehicles.

In one aspect, the skirt assembly also can include at least one support member coupling the bladder to a first vehicle of the plural vehicles. The skirt assembly can be configured, when the bladder is inflated to at least partially fill the spatial gap between the first vehicle and an adjacent, second vehicle, for the bladder to no more than abut the second vehicle and not be coupled to the vehicle.

In another embodiment, another system (e.g., another aerodynamic control system) includes a skirt assembly configured to be disposed between plural vehicles in a vehicle system formed from the plural vehicles with the vehicles separated by a spatial gap in the vehicle system. The skirt assembly can include one or more flexible sheets configured to be coupled with the vehicles on opposite sides of the spatial gap such that the one or more flexible sheets at least partially enclose the spatial gap. The skirt assembly can reduce aerodynamic drag exerted on the vehicle system during movement of the vehicle system relative to the vehicle system moving without the skirt assembly.

In one aspect, the skirt assembly also can include a spool configured to be coupled with the vehicle system. The one or more flexible sheets can be configured to be one or more of wound or unwound from the spool.

In one aspect, the one or more flexible sheets can be coupled with one or more stiffening bodies that extend between the vehicles across the spatial gap.

In one aspect, at least one of the one or more stiffening bodies can include a magnet configured to couple the one or more flexible sheets to at least one of the vehicles.

In one aspect, the one or more stiffening bodies can form a tubular frame that is coupled with the one or more flexible sheets and that extends across the spatial gap between the vehicles to form an enclosure around the spatial gap between the vehicles.

In one aspect, the frame formed by the one or more stiffening bodies can include a first frame portion and at least a second frame portion. At least the second frame portion can be configured to slide relative to the first frame portion such that the first frame portion and the at least a second frame portion telescope relative to one other.

In one aspect, the frame formed by the one or more stiffening bodies can be configured to alternate between a collapsed state where the skirt assembly does not extend across the spatial gap between the vehicles and an expanded state where the skirt assembly does extend across the spatial gap.

In one aspect, the system also includes a handle connected with the frame that can be configured to be manually actuated to change the skirt assembly between the collapsed state and the expanded state.

In one aspect, the vehicle system can include a first vehicle and a second vehicle, with the first vehicle having a first end and the second vehicle having a second end. The second end can lie opposed to the first end of the first vehicle and the spatial gap defined between the first end of the first vehicle and the second end of the second vehicle. The system can also include a first connector assembly configured for attachment of the skirt assembly to the first end of the first vehicle, for the skirt assembly to at least partially encompass a first bulkhead area of the first end of the first vehicle. The first bulkhead area may lack any portals for an operator to move from within the first vehicle to outside the first vehicle. The system also can include a second connector assembly configured for attachment of the skirt assembly to the second end of the second vehicle, for the skirt assembly to at least partially encompass a second bulkhead area of the second end of the second vehicle. The second bulkhead area may lack any portals for an operator to move from within the second vehicle to outside the second vehicle.

In one aspect, the skirt assembly, when coupled with the vehicles, is configured to enclose at least 90% of a volume of the spatial gap as defined by a coextensive end area of bodies of the vehicles and one or more distances between the bodies of the vehicles within the coextensive end area.

In another embodiment, another aerodynamic control system includes a skirt assembly configured for attachment to a vehicle chassis, where the skirt assembly is configured, when attached to the vehicle chassis, to be expandable from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. The skirt assembly, when in the expanded state and during operation of the vehicle and the adjacent vehicle for movement along a route, is configured to no more than abut the adjacent vehicle and not be coupled to the adjacent vehicle.

In one aspect, the skirt assembly can include a bladder configured to be inflated with a fluid by a fluid source attached to the vehicle chassis, to cause the skirt assembly to expand from the collapsed state to the expanded state.

In one aspect, the skirt assembly comprises a frame and one or more flexible sheets attached to the frame. At least a portion of the frame is moveable to expand the skirt assembly from the collapsed state, such that the one or more flexible sheets fill less of the spatial gap, to the expanded state such that the one or more flexible sheets fill more of the spatial gap.

In another embodiment, a system (e.g., an aerodynamic control system) includes a skirt assembly configured for attachment to a vehicle chassis. (An example of a vehicle chassis is generally pointed to by reference numeral 104 in FIG. 7.) The skirt assembly is configured, when attached to the vehicle chassis, to be expandable from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. The skirt assembly, when in the expanded state and during operation of the vehicle and the adjacent vehicle for movement along a route, is configured to no more than abut the adjacent vehicle and not be coupled to the adjacent vehicle. The skirt assembly may be further configured to be retractable from the expanded state to the collapsed state. (According to one aspect, the skirt assembly, after being attached to the vehicle chassis, is moveable from the collapsed state to the expanded state and vice versa. Thus, in effect, after installation, the skirt assembly is selectively deployable and retractable between the collapsed and expanded states.)

In another embodiment of the system, the skirt assembly includes a bladder configured to be inflated with a fluid by a fluid source attached to the vehicle chassis, to cause the skirt assembly to expand from the collapsed state to the expanded state.

In another embodiment of the system, the skirt assembly includes a frame and one or more flexible sheets attached to the frame. At least a portion of the frame is moveable to expand the skirt assembly from the collapsed state, such that the one or more flexible sheets fill less of the spatial gap, to the expanded state such that the one or more flexible sheets fill more of the spatial gap.

In another embodiment, a vehicle includes a vehicle chassis and a skirt assembly attached to the vehicle chassis. (An example of a vehicle chassis is generally pointed to by reference numeral 104 in FIG. 7.) The skirt assembly is configured to expand from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. "Less" and "more" are relative to one another, that is, in the collapsed state the skirt assembly fills a particular percentage of the spatial gap (the particular percentage is less than 100%), and in the expanded state the skirt assembly fills a percentage of the spatial gap (up to 100%) that is greater than the particular percentage. The skirt assembly may be further configured to be retractable from the expanded state to the collapsed state.

In another embodiment, a vehicle includes a vehicle chassis and a skirt assembly attached to the vehicle chassis. The skirt assembly is configured to expand from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. The vehicle further includes a fluid source attached to the vehicle chassis. The skirt assembly includes a bladder configured to be inflated with a fluid by the fluid source to cause the skirt assembly to expand from the collapsed state to the expanded state.

In another embodiment, a vehicle includes a vehicle chassis and a skirt assembly attached to the vehicle chassis. The skirt assembly is configured to expand from a collapsed state, such that the skirt assembly fills less of a spatial gap between the vehicle and an adjacent vehicle to which the vehicle is removably coupled, to an expanded state such that the skirt assembly fills more of the spatial gap between the vehicle and the adjacent vehicle. The skirt assembly includes a frame and one or more flexible sheets attached to the frame. At least a portion of the frame is moveable to expand the skirt assembly from the collapsed state, such that the one or more flexible sheets fill less of the spatial gap, to the expanded state, such that the one or more flexible sheets fill more of the spatial gap.

In one aspect, the frame can be configured to one or more of expand or contract between the vehicle and the adjacent vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   a skirt assembly configured to be disposed between plural vehicles in a vehicle system formed from the plural vehicles with the vehicles separated by a spatial gap in the vehicle system, the skirt assembly including a bladder configured to be inflated with a fluid by a fluid source disposed onboard the vehicle system to cause the skirt assembly to expand between the vehicles from a collapsed state to an expanded state such that the skirt assembly at least partially fills the spatial gap between the vehicles,
   wherein the skirt assembly reduces aerodynamic drag exerted on the vehicle system during movement of the vehicle system relative to the vehicle system moving without the skirt assembly in the expanded state; and
   a controller configured to monitor inflation of the bladder and to at least partially deflate the bladder responsive to determining that the vehicle system traveling on a route is approaching a section of the route having a radius of curvature that is smaller than a designated threshold.

2. The system of claim 1, wherein the controller also is configured to at least partially deflate the bladder responsive to determining that a moving speed of the vehicle system exceeds a second designated threshold.

3. The system of claim 1, further wherein the controller is configured to remotely control inflation of the bladder by the fluid source.

4. The system of claim 3, wherein the controller is configured to detect a leak in the bladder and, responsive to detecting the leak, to stop delivery of the fluid from the fluid source to the bladder.

5. The system of claim 1, wherein the bladder is configured to be fluidly coupled with an onboard compressor that controls inflation of the bladder by the fluid source.

6. The system of claim 1, wherein the fluid source includes a brake line of an air brake system of the vehicle system and the fluid comprises air from the air brake system.

7. The system of claim 1, wherein the bladder includes a vent configured to direct air that is moving relative to the vehicle system during the movement of the vehicle system from outside of the bladder into the bladder to at least partially inflate the bladder.

8. The system of claim 1, wherein the bladder includes one or more flexible sheets configured to change shape during the expanded state of the skirt assembly such that the skirt assembly changes shape between the vehicles during the movement of the vehicle system along a curved segment of a route along which the vehicle system travels.

9. The system of claim 1, wherein the bladder is configured to be inflated such that the bladder engages both of the vehicles that the bladder is disposed between and at least substantially fills the spatial gap between the vehicles.

10. The system of claim 1, wherein the skirt assembly further comprises at least one support member coupling the bladder to a first vehicle of the plural vehicles, wherein the skirt assembly is configured, when the bladder is inflated to at least partially fill the spatial gap between the first vehicle and an adjacent, second vehicle, for the bladder to no more than abut the second vehicle and not be coupled to the second vehicle.

11. The system of claim 1, wherein the controller also is configured to determine that the vehicle system is moving toward a curve in a route being traveled by the vehicle system and, in response to determining that the vehicle system is moving toward the curve, deflate the bladder of the skirt assembly.

12. The system of claim 1, wherein the spatial gap between the vehicles in the vehicle system is one of plural spatial gaps between the vehicles in neighboring pairs of the vehicles in the vehicle system,
   wherein the bladder of the skirt assembly is one of plural bladders of the skirt assembly with different bladders disposed in different spatial gaps between the vehicles in the neighboring pairs of the vehicles, and
   wherein the bladders are fluidly coupled with each other.

13. The system of claim 1, further comprising a spring configured to deflate the bladder by compressing the bladder to squeeze out the fluid from the bladder.

14. A system comprising:
   a bladder configured for attachment to a vehicle chassis, wherein the bladder is configured, when attached to the vehicle chassis, to be inflated from a collapsed state, such that the bladder fills less of a spatial gap between the vehicle and an adjacent vehicle to which the vehicle is removably coupled, to an expanded state such that the bladder fills more of the spatial gap between the vehicle and the adjacent vehicle, and wherein the bladder, when in the expanded state and during operation of the vehicle and the adjacent vehicle for movement along a route, is configured to no more than abut the adjacent vehicle and not be coupled to the adjacent vehicle; and
   a controller configured to monitor inflation of the bladder and to at least partially deflate the bladder responsive to determining that the vehicle and the adjacent vehicle are approaching a section of the route having a radius of curvature that is smaller than a designated threshold.

15. The system of claim 14, wherein the skirt assembly comprises a bladder configured to be inflated with a fluid by a fluid source device attached to the vehicle chassis, to cause the skirt assembly to expand from the collapsed state to the expanded state.

16. The system of claim 14, wherein the controller also is configured to determine that the vehicle is moving toward a curve in a route being traveled by the vehicle and, in response to determining that the vehicle is moving toward the curve, deflate the bladder of the skirt assembly.

17. The system of claim 14, wherein the vehicle and the adjacent vehicle are two of three or more vehicles in a vehicle system and the spatial gap between the vehicle and the adjacent vehicle in the vehicle system is one of plural spatial gaps between the three or more vehicles in the vehicle system, wherein the bladder of the skirt assembly is one of plural bladders of the skirt assembly with different bladders disposed in different spatial gaps between the vehicles in neighboring pairs of the three or more vehicles, and wherein the bladders are fluidly coupled with each other.

18. The system of claim 14, further comprising a spring configured to deflate the bladder by compressing the bladder to squeeze out air from the bladder.

\* \* \* \* \*